United States Patent
Ogino et al.

(10) Patent No.: US 10,807,457 B2
(45) Date of Patent: Oct. 20, 2020

(54) TRANSAXLE DEVICE FOR HYBRID VEHICLE HAVING CONNECTION/DISCONNECTION MECHANISM THAT ENABLES OR DISABLES TRANSMISSION OF POWER OF ELECTRIC MACHINE

(71) Applicant: MITSUBISHI JIDOSHA KOGYO KABUSHIKI KAISHA, Tokyo (JP)

(72) Inventors: Daizo Ogino, Tokyo (JP); Masahiro Matsushita, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 16/302,246

(22) PCT Filed: Mar. 27, 2017

(86) PCT No.: PCT/JP2017/012274
§ 371 (c)(1),
(2) Date: Nov. 16, 2018

(87) PCT Pub. No.: WO2017/217067
PCT Pub. Date: Dec. 21, 2017

(65) Prior Publication Data
US 2019/0270373 A1    Sep. 5, 2019

(30) Foreign Application Priority Data

Jun. 13, 2016 (JP) ................................. 2016-117008

(51) Int. Cl.
| | |
|---|---|
| *G06G 7/70* | (2006.01) |
| *B60K 6/387* | (2007.10) |
| *B60W 30/188* | (2012.01) |
| *F16H 3/089* | (2006.01) |
| *B60K 6/547* | (2007.10) |

(Continued)

(52) U.S. Cl.
CPC ............... *B60K 6/387* (2013.01); *B60K 6/36* (2013.01); *B60K 6/40* (2013.01); *B60K 6/405* (2013.01);

(Continued)

(58) Field of Classification Search
CPC ............ B60K 6/387; B60K 6/36; B60L 50/16
See application file for complete search history.

(56) References Cited

U.S. PATENT DOCUMENTS

| | | | |
|---|---|---|---|
| 2007/0099748 A1* | 5/2007 | Matsubara | ............ B60W 10/08 477/3 |
| 2014/0080666 A1 | 3/2014 | Rühle et al. | |
| 2014/0374211 A1 | 12/2014 | Date | |

FOREIGN PATENT DOCUMENTS

| | | |
|---|---|---|
| EP | 2821270 A1 | 1/2015 |
| JP | 11-170877 A | 6/1999 |

(Continued)

OTHER PUBLICATIONS

International Search Report, issued in PCT/JP2017/012274, PCT/ISA/210, dated Jun. 20, 2017.

(Continued)

*Primary Examiner* — Adam M Alharbi
(74) *Attorney, Agent, or Firm* — Birch, Stewart, Kolasch & Birch, LLP

(57) ABSTRACT

A transaxle device (1) for a hybrid vehicle including an engine (2), a first rotating electric machine (3), and a second rotating electric machine (4) individually transmits power of the engine (2) and power of the first rotating electric machine (3) to an output shaft (12) on the side of a drive wheel from different power transmission paths and also transmits the power of the engine (2) to the second rotating electric machine (4). Further, the transaxle device (1) includes a connection/disconnection mechanism (20) which is interposed on a first power transmission path (51) from the first rotating electric machine (3) to the output shaft (12). The connection/disconnection mechanism (20) enables or disables the transmission of the power of the first rotating electric machine (3).

6 Claims, 13 Drawing Sheets

(51) Int. Cl.
| | |
|---|---|
| *B60K 6/405* | (2007.10) |
| *B60K 17/04* | (2006.01) |
| *B60K 17/02* | (2006.01) |
| *B60K 6/36* | (2007.10) |
| *B60K 6/442* | (2007.10) |
| *B60K 6/40* | (2007.10) |
| *B60L 50/16* | (2019.01) |

(52) U.S. Cl.
CPC .............. *B60K 6/442* (2013.01); *B60K 6/547* (2013.01); *B60K 17/02* (2013.01); *B60K 17/04* (2013.01); *B60L 50/16* (2019.02); *B60W 30/188* (2013.01); *F16H 3/089* (2013.01); *B60W 2710/022* (2013.01); *Y02T 10/6234* (2013.01)

(56) References Cited

FOREIGN PATENT DOCUMENTS

| | | |
|---|---|---|
| JP | 2013-180680 A | 6/1999 |
| JP | 2005-351381 A | 12/2005 |
| JP | 2008-239124 A | 10/2008 |
| JP | 2009-67091 A | 4/2009 |
| JP | 2013-154683 A | 8/2013 |
| WO | WO-2011/128538 A1 | 10/2011 |

OTHER PUBLICATIONS

Written Opinion of the International Searching Authority, issued in PCT/JP2017/012274, PCT/ISA/237, dated Jun. 20, 2017.
Japanese Office Action, dated Feb. 4. 2020; for Japanese Application No. 2018-523329, with an English translation.
Korean Office Action, dated Dec. 13, 2019, for Korean Application No. 10-2018-7035801, with an English translation.
International Preliminary Report on Patentability and English translation of the Written Opinion of the International Searching Authority (forms PCT/IB/373 and PCT/ISA/237), dated Dec. 18, 2018, for International Application No. PCT/JP2017/012274.
Japanese Office Action for Japanese Application No. 2018-523329, dated Jul. 30, 2019, with English translation.

\* cited by examiner

TRANSAXLE DEVICE FOR HYBRID VEHICLE HAVING CONNECTION/DISCONNECTION MECHANISM THAT ENABLES OR DISABLES TRANSMISSION OF POWER OF ELECTRIC MACHINE

TECHNICAL FIELD

The present invention relates to a transaxle device used in a hybrid vehicle including an engine and two rotating electric machines.

BACKGROUND ART

Conventionally, among hybrid vehicles including an engine and a rotating electric machine (a motor, a generator, and a motor generator), vehicles traveling while switching traveling modes are in practical use. A traveling mode includes an EV mode in which the vehicle travels only by a motor using charged power of a battery, a series mode in which the vehicle travels only by a motor while driving a generator to generate electric power by an engine, and a parallel mode in which the vehicle travels by using an engine and a motor together. The switching of the traveling mode is performed by controlling a mechanism such as a sleeve or a clutch interposed on a power transmission path inside a transaxle device. This mechanism is disposed on, for example, a shaft inside the power transmission path between the engine and the generator or a shaft inside the power transmission path between the engine and a drive wheel (see Patent Literatures 1 and 2).

PRIOR ART DOCUMENTS

Patent Documents

Patent Document 1: Japanese Laid-open Patent Publication No. 11-170877
Patent Document 2: Japanese Laid-open Patent Publication No. 2013-180680

SUMMARY OF INVENTION

Technical Problem

Incidentally, in the hybrid vehicle capable of individually outputting the power of the engine and the power of the motor, a power transmission path from the engine to the drive wheel and a power transmission path from the motor to the drive wheel are separately provided. Further, in such a hybrid vehicle, a traveling mode (a parallel mode) using the power of the engine is generally selected when a traveling load or a traveling speed increases. When the motor is used together in accordance with the necessity in the parallel mode, the motor rotates while being driven by the drive wheel during the traveling operation only using the engine. When a voltage caused by the rotation of the motor at this time exceeds a voltage of a driving battery, a regenerative brake acts on the vehicle and hence a driver may feel uncomfortable. Therefore, conventionally, an unexpected regenerative brake in a high-speed traveling state is prevented by a weak field control.

However, since electric power is consumed for the weak field control, this control is not desirable from the viewpoint of improvement in electricity cost.

The object of the invention is to provide a transaxle device capable of improving electricity cost. Furthermore, this object is not limited and another object of the invention is to exhibit operations and effects which are derived by each configuration illustrated in the embodiment for carrying out the invention to be described later and which is not obtainable by the conventional technique.

Solution to Problem (1) A transaxle device disclosed herein is a transaxle device for a hybrid vehicle including an engine, a first rotating electric machine, and a second rotating electric machine and operable to individually transmit power of the engine and power of the first rotating electric machine to an output shaft on a drive wheel side and also to transmit the power of the engine to the second rotating electric machine, the transaxle device including: a connection/disconnection mechanism which is interposed on a power transmission path from the first rotating electric machine to the output shaft and enables or disables the transmission of the power of the first rotating electric machine. Further, the first rotating electric machine means an electric power generator (a motor generator) or an electric motor which includes a rotating armature or field and has at least an electric motor function. Furthermore, the second rotating electric machine means an electric power generator (a motor generator) or an electric power generator which includes a rotating armature or field and has at least an electric power generator function.

(2) The power transmission path from the first rotating electric machine to the output shaft may be provided with a first rotating electric machine shaft coaxially connected to a rotating shaft of the first rotating electric machine and a counter shaft located between the first rotating electric machine shaft and the output shaft and the connection/disconnection mechanism may be interposed in the counter shaft.

(3) In this case, preferably, a fixed gear on the first rotating electric machine shaft normally engages with an idle gear on the counter shaft and the number of teeth of the idle gear may be larger than the number of teeth of the fixed gear.

(4) Alternatively, the power transmission path from the first rotating electric machine to the output shaft may be provided with a first rotating electric machine shaft coaxially connected to a rotating shaft of the first rotating electric machine and a counter shaft located between the first rotating electric machine shaft and the output shaft, and the connection/disconnection mechanism may be interposed in the first rotating electric machine shaft.

(5) In this case, the transaxle device may include a differential gear which is interposed in the output shaft, and the connection/disconnection mechanism may be interposed at a position overlapping the differential gear in a direction orthogonal to an axial direction of the output shaft.

(6) Further, the connection/disconnection mechanism may include an annular sleeve which is combined with a shaft provided on the power transmission path so as not to be relatively rotatable and to be slidable in an axial direction, and the sleeve may turn the idle gear rotatable relative to the shaft into a rotational connection state with respect to the shaft by moving in the axial direction.

(7) The connection/disconnection mechanism may include an idle gear which is pivotally supported to a shaft provided on the power transmission path so as to be relatively rotatable and a clutch which includes a first engagement component fixed to the shaft and a second engagement component fixed to the idle gear.

(8) The transaxle device may further include a switching mechanism which includes a sleeve or a clutch interposed on a power transmission path from the engine to the output shaft and switches a high gear stage and a low gear stage.

Advantageous Effects of Invention

Since the connection/disconnection mechanism which enables or disables the transmission of the power of the first rotating electric machine is provided, it is possible to prevent the rotation of the drive wheel when the first rotating electric machine is turned off. For this reason, since the weak field control which has been performed conventionally is unnecessary, the electric power consumed by the weak field control can be used for a traveling operation. That is, since the connection/disconnection mechanism is provided, electricity cost can be improved.

DESCRIPTION OF EMBODIMENTS

A transaxle device of an embodiment will be described with reference to the drawings. Each of the following embodiments is merely an example and there is no intention to exclude the application of various modifications and techniques not mentioned in the following embodiments. The configurations of the embodiments can be modified into various forms without departing from the gist thereof. Further, the configurations can be appropriately selected or combined as appropriate.

1. Overall Configuration

Figure 1:
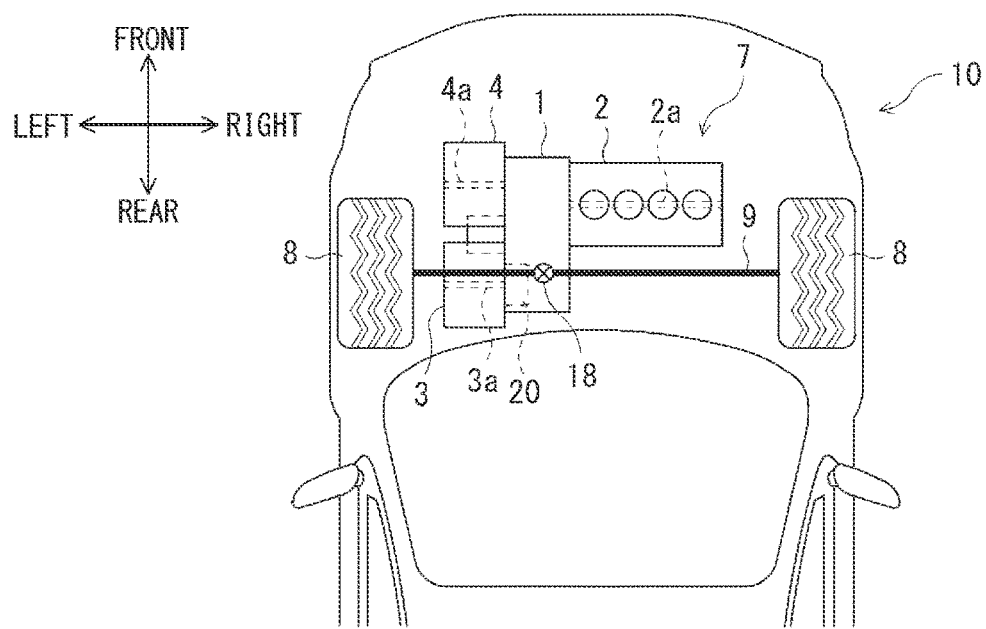
FIG. 1 is a top view illustrating an internal configuration of a vehicle including a transaxle device according to an embodiment.

A transaxle 1 (a transaxle device) of the embodiment is applied to a vehicle 10 illustrated in FIG. 1. The vehicle 10 is a hybrid vehicle which includes an engine 2, a traveling motor 3 (an electric motor, a first rotating electric machine), and an electric power generator 4 (an electric power generator, a second rotating electric machine). The generator 4 is connected to the engine 2 and is operable independently from the operation state of the motor 3. Further, the vehicle 10 is provided with three traveling modes including an EV mode, a series mode, and a parallel mode. These traveling modes are alternatively selected in response to a vehicle state, a travel state, or a driver's request output by an electronic control device (not illustrated) and hence the engine 2, the motor 3, and the generator 4 can be separately used in response to the type. It is to be noted that, the motor 3 may have a power generation function (a function of a generator) and the generator 4 may have an electric motor function (a function of a motor).

The EV mode is a traveling mode in which the vehicle 10 is driven only by the motor 3 using charged power of a driving battery (not illustrated) while the engine 2 and the generator 4 are stopped. The EV mode is selected in a case in which the traveling load and the traveling speed are low or the battery charge level is high. The series mode is a traveling mode in which the vehicle 10 is driven by the motor 3 using power while driving the generator 4 to generate electric power by the engine 2. The series mode is selected in a case in which the traveling load and the traveling speed are intermediate or the battery charge level is low. The parallel mode is a traveling mode in which the vehicle 10 is mainly driven by the engine 2 and the driving of the vehicle 10 is assisted by the motor 3 as appropriate and is selected in a case in which the traveling load and the traveling speed are high.

The engine 2 and the motor 3 are connected in parallel to a drive wheel 8 through the transaxle 1 and the power of each of the engine 2 and the motor 3 is individually transmitted thereto. Further, the generator 4 and the drive wheel 8 are connected in parallel to the engine 2 through the transaxle 1 and the power of the engine 2 is also transmitted to the generator 4 in addition to the drive wheel 8.

The transaxle 1 is a power transmission device which is obtained by integrating a final drive (a final speed reducer) including a differential gear 18 (a differential device, hereinafter referred to as the "differential 18") and a transmission (a speed reducer) and includes a plurality of mechanisms which are in charge of transmission of power between a drive source and a driven device. The transaxle 1 of the embodiment is configured to be switchable between a high/low state (a high speed stage and a low speed stage). When the vehicle travels in the parallel mode, a high gear stage and a low gear stage are switched in response to the travel state or the request output by the electronic control device.

The engine 2 is an internal combustion engine (a gasoline engine or a diesel engine) which burns gasoline or light oil. The engine 2 is a so-called transverse engine in which a direction of a crankshaft 2a (a rotating shaft) is disposed laterally to be aligned with a vehicle width direction of the vehicle 10 and is fixed to the right side surface of the transaxle 1. The crankshaft 2a is disposed in parallel to a drive shaft 9 of the drive wheel 8. The operation state of the engine 2 is controlled by the electronic control device.

Both the motor 3 and the generator 4 are an electric power generator (a motor generator) which has a function of an electric motor and a function of an electric power generator. The motor 3 mainly functions as an electric motor to drive the vehicle 10 and functions as an electric power generator at the time of regeneration. The generator 4 functions as an electric motor (a starter) at the time of starting the engine 2 and generates electric power by the power of the engine at the time of operating the engine 2. An inverter (not illustrated) which converts a DC current and an AC current is provided in the periphery (or the inside) of each of the motor 3 and the generator 4. The rotation speed of each of the motor 3 and the generator 4 is controlled by controlling the inverter. The operation state of each of the motor 3, the generator 4, and each inverter is controlled by the electronic control device.

The motor 3 of the embodiment is formed such that an outer shape is formed in a cylindrical shape using a rotating shaft 3a as a center axis and is fixed to the left side surface of the transaxle 1 in a posture in which a bottom surface thereof faces the transaxle 1. The generator 4 of the embodiment is formed such that an outer shape is formed in a cylindrical shape using a rotating shaft 4a as a center axis and is fixed to the left side surface of the transaxle 1 in a posture in which a bottom surface thereof faces the transaxle 1 similarly to the motor 3.

Figure 2:
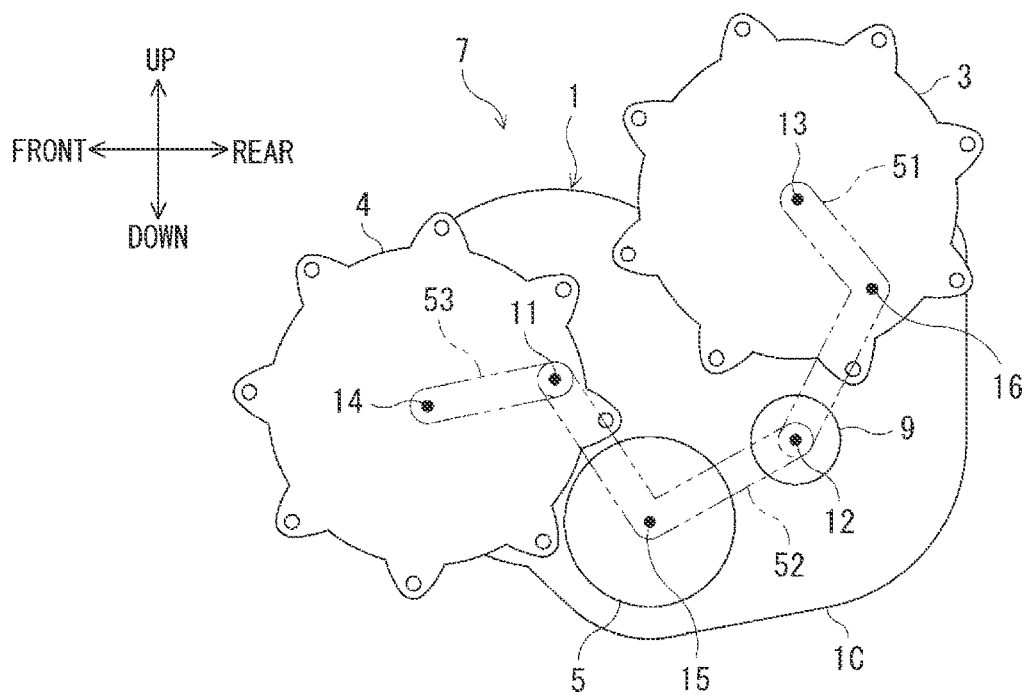
FIG. 2 is a schematic side view of a power train including the transaxle device of FIG. 1.

FIG. 2 is a side view when the engine 2, the motor 3, the generator 4, and a power train 7 including the transaxle 1 are viewed from the left side. The engine 2 is omitted in the side view. As illustrated in FIG. 2, a pump 5 is fixed to the left side surface of the transaxle 1 in addition to the motor 3 and the generator 4. The pump 5 is a hydraulic pressure generation device which pressure-feeds oil functioning as working oil or lubricating oil to a hydraulic circuit (not illustrated) using power of the drive wheel 8.

2. Transaxle

Figure 3:
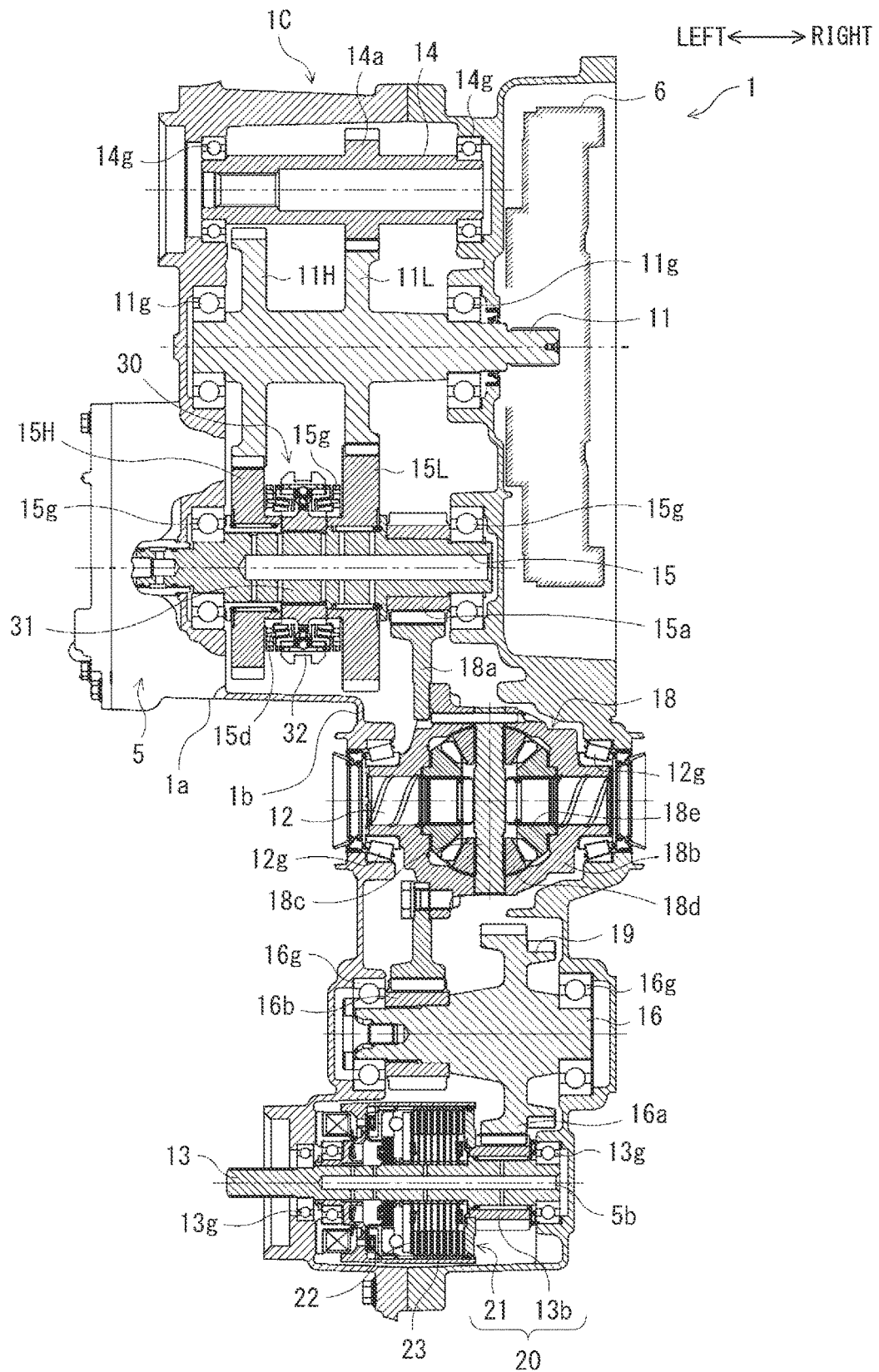
FIG. 3 is a cross-sectional view in which the transaxle device of FIG. 1 is cut in an axial direction along a power transmission path.
Figure 4:
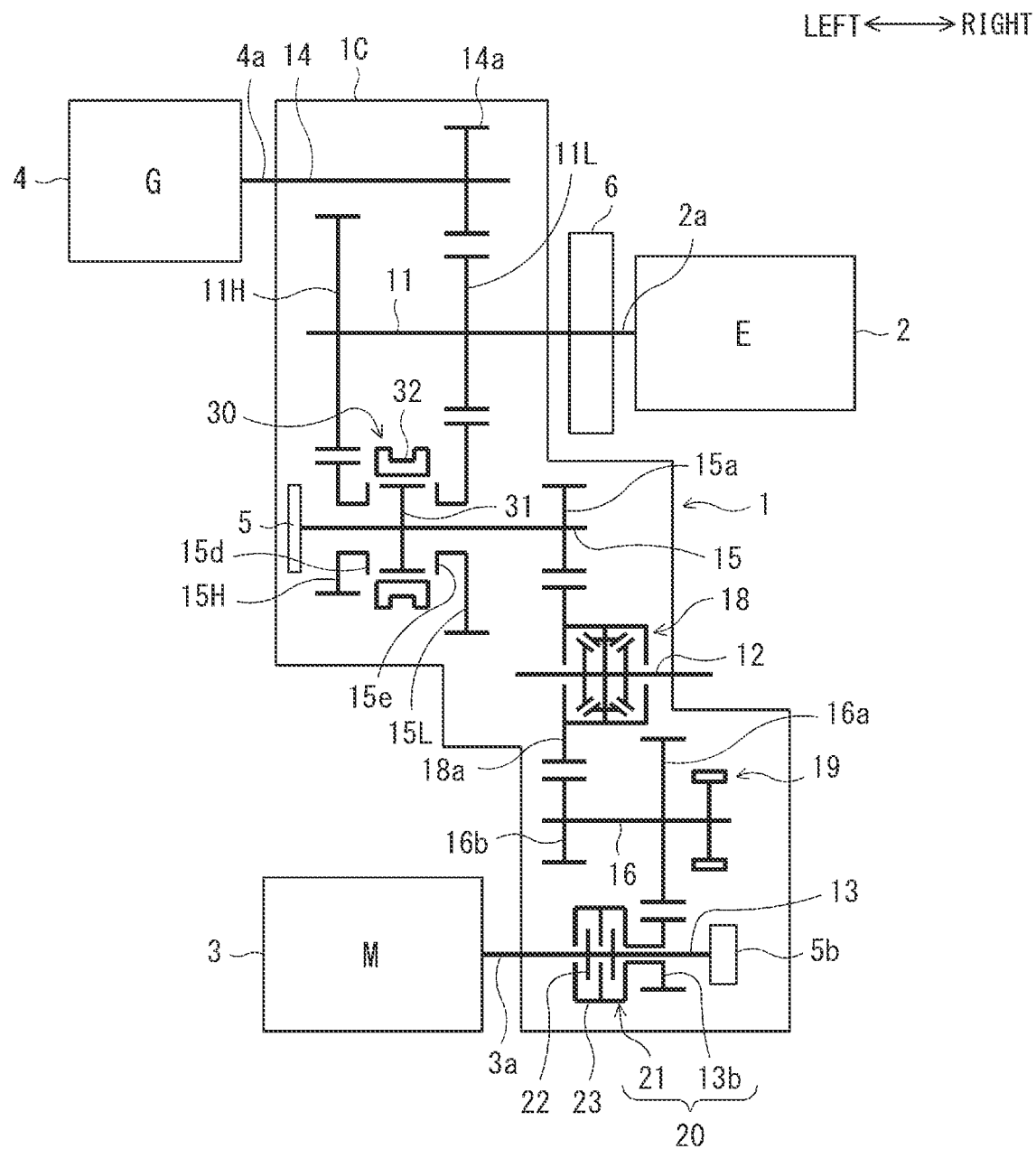
FIG. 4 is a skeleton diagram illustrating a power train including the transaxle device of FIG. 3.

FIG. 3 is a cross-sectional view in which the transaxle 1 of the embodiment is cut in the axial direction along the power transmission path and FIG. 4 is a skeleton diagram of the power train 7 including the transaxle 1. In the skeleton diagram after FIG. 4, the pump 5 and the transaxle 1 are illustrated in an integrated state (a state in which the pump 5 is built in the casing 1C).

As illustrated in FIGS. 2 to 4, the transaxle 1 is provided with six shafts 11 to 16 which are arranged in parallel. Hereinafter, a rotating shaft which is coaxially connected to the crankshaft 2a will be referred to as an input shaft 11. Similarly, rotating shafts which are coaxially connected to the drive shaft 9, the rotating shaft 3a of the motor 3, and the rotating shaft 4a of the generator 4 will be respectively referred to as an output shaft 12, a motor shaft 13 (a first rotating electric machine shaft), and a generator shaft 14. Further, a rotating shaft which is disposed on the power transmission path between the input shaft 11 and the output shaft 12 will be referred to as a first counter shaft 15 and a rotating shaft which is disposed on the power transmission path between the motor shaft 13 and the output shaft 12 will be referred to as a second counter shaft 16.

As illustrated in FIG. 3, both end portions of all of six shafts 11 to 16 are journaled to the casing 1C through bearings 11g to 16g. Further, an opening is formed in the side surface of the casing 1C located on each of the input shaft 11, the output shaft 12, the motor shaft 13, and the generator shaft 14 and the shafts are connected to the crankshaft 2a and the like through the opening. Furthermore, a torque limiter 6 having a function of protecting the power transmission mechanism by interrupting excessive torque is interposed on the crankshaft 2a. As illustrated in FIG. 4, the rotating shaft of the pump 5 is connected to the first counter shaft 15.

Three power transmission paths are formed inside the transaxle 1. Specifically, a power transmission path (hereinafter, referred to as a "first path 51") extending from the motor shaft 13 to the output shaft 12, a power transmission path (hereinafter, referred to as a "second path 52") extending from the input shaft 11 to the output shaft 12, and a power transmission path (hereinafter, referred to as a "third path 53") extending from the input shaft 11 to the generator shaft 14 are formed as indicated by a two-dotted chain line in FIG. 2.

The first path 51 (the first power transmission path) is a path which involves with the transmission of power from the motor 3 to the drive wheel 8 and is in charge of the transmission of power of the motor 3. A connection/disconnection mechanism 20 to be described later is interposed in the course of the first path 51 to switch a power transmission enabled/disabled state. The second path 52 (the second power transmission path) is a path which involves with the transmission of power from the engine 2 to the drive wheel 8 and is in charge of the transmission of power during the operation of the engine 2. A switching mechanism 30 to be described later is interposed in the course of the second path 52 to switch a power transmission enabled/disabled state and a high/low state. The third path 53 (the third power transmission path) is a path which involves with the transmission of power from the engine 2 to the generator 4 and is in charge of the transmission of power at the time of starting the engine and generating electric power by the engine 2.

Next, a configuration of the transaxle 1 will be described in detail with reference to FIGS. 3 and 4. In the following description, the "fixed gear" means a gear which is integrated with the shaft and is not rotatable relative to the shaft. Further, the "idle gear" means a gear which is pivotally supported to the shaft so as to be relatively rotatable.

The input shaft 11 is provided with two fixed gears 11H and 11L. Two fixed gears 11H and 11L have different number of teeth and respectively normally engage with two idle gears 15H and 15L provided in the first counter shaft 15 to have different number of teeth.

In the embodiment, one fixed gear 11L having a small number of teeth is disposed at the right side (the side of the differential 18) and the other fixed gear 11H having a large number of teeth is disposed at the left side (the opposite side to the differential 18 with respect to one fixed gear 11L). One fixed gear 11L having a small number of teeth engages with one idle gear 15L having a large number of teeth to fault the low gear stage. In contrast, the other fixed gear 11H having a large number of teeth engages with the other idle gear 15H having a small number of teeth to form the high gear stage.

That is, in the first counter shaft 15, the idle gear 15L having a large diameter is disposed at a position close to the differential 18 and the idle gear 15H having a small diameter is disposed at a position away from the differential 18. Since the first counter shaft 15 is adjacent to the output shaft 12 having the differential 18 interposed therein, for example, a portion along the first counter shaft 15 in the casing 1C (a cylindrical portion indicated by the reference numeral 1a in FIG. 3) can be decreased in diameter outward in a direction moving away from the differential 18 (a leftward direction in FIG. 3) with the arrangement of these gears. Alternatively, since the cylindrical portion 1a is located at the left side of FIG. 3 in relation to the idle gear 15L having a large diameter when the casing 1C is provided so that a casing side surface 1b provided with an opening of the output shaft 12 is located at the outside in the radial direction between the idle gear 15L having a large diameter and the idle gear 15H having a small diameter, the cylindrical portion 1a can be decreased in size on the whole. With such a configuration, a space for connecting the drive shaft 9 is secured on the extension line of the output shaft 12 outside the casing 1C.

The low side fixed gear 11L normally engages with the fixed gear 14a provided in the generator shaft 14. That is, the input shaft 11 and the generator shaft 14 are connected to each other through two fixed gears 11L and 14a so that power can be transmitted between the engine 2 and the generator 4.

In the idle gear 15H, a left portion is provided with a tooth surface portion engaging with the fixed gear 11H and a dog gear 15d is provided to be coupled to a contact portion protruding from the right side of the tooth surface portion. In the idle gear 15L, a right portion is provided with a tooth surface portion engaging with the fixed gear 11L and a dog gear 15e is provided to be coupled to a contact portion protruding from the left side of the tooth surface portion. A front end portion (an outer end portion in the radial direction) of each of the dog gears 15d and 15e is provided with dog teeth (not illustrated).

The switching mechanism 30 is disposed between two idle gears 15H and 15L and is operable to control the power connection/disconnection state of the engine 2 and to switch a high gear stage and a low gear stage. The switching mechanism 30 of the embodiment includes a hub 31 which is fixed to the first counter shaft 15 and an annular sleeve 32 which is combined with the hub 31 (the first counter shaft 15) so as not to be relatively rotatable and to be slidable in the axial direction of the first counter shaft 15. The sleeve 32 moves to both left and right sides from a neutral position in the drawing when an actuator (not illustrated) is controlled by an electronic control device. Spline teeth (not illustrated) engaging with the dog teeth of the dog gears 15d and 15e are provided at the inside of the sleeve 32 in the radial direction. When the spline teeth engage with the dog teeth, the sleeve 32 engages with the dog gear 15d or the dog gear 15e.

When the sleeve 32 is located at a neutral position, two idle gears 15H and 15L are in an idle rotation state. In this case, even when the engine 2 is operated, the power of the engine 2 (the rotation of the input shaft 11) is not transmitted to the output shaft 12. That is, in this case, the transmission of the power of the engine 2 is interrupted.

When the sleeve 32 moves to any one of left and right sides from the neutral position so as to engage with one of the dog gears 15d and 15e of two idle gears 15H and 15L, the rotation of the input shaft 11 is transmitted to any one of the idle gears 15H and 15L. Hereinafter, this state will be referred to as a rotatable connection state. In the transaxle 1 of the embodiment, since the sleeve 32 moves to the right side so as to engage with the dog gear 15e of the idle gear 15L, the idle gear 15L of the low gear stage enters the rotational connection state with respect to the first counter shaft 15. In contrast, when the sleeve 32 moves to the left side so as to engage with the dog gear 15d of the idle gear 15H, the idle gear 15H of the high gear stage enters the rotational connection state with respect to the first counter shaft 15.

Further, the transaxle 1 of the embodiment synchronizes the rotation speed of the input shaft 11 (that is, the rotation speed of the idle gears 15H and 15L) with the rotation speed of the drive wheel 8 by the generator 4 in accordance with the movement of the sleeve 32. That is, when the sleeve 32 engages with the dog gears 15d and 15e of at least one of the idle gears 15H and 15L (at the time of selecting the high gear stage or the low gear stage or switching the high gear stage and the low gear stage), an inverter of the generator 4 is controlled by an electronic control device so that the rotation speed of the input shaft 11 is adjusted to the rotation speed of the first counter shaft 15 before the engagement.

As this control method, for example, a method of detecting a rotation speed difference (a rotation difference) between the input shaft 11 and the drive wheel 8 by a sensor and applying a load from the generator 4 to the rotation of the input shaft 11 in response to the rotation speed difference to synchronize the rotation speed can be exemplified. Alternatively, a method of detecting the rotation speed of the drive wheel 8 by a sensor and controlling the rotation speed of the generator 4 to be synchronized with the rotation speed of the drive wheel can be exemplified.

As illustrated in FIGS. 3 and 4, the first counter shaft 15 is provided with a fixed gear 15a which is adjacent to the right side of the low side idle gear 15L. The fixed gear 15a normally engages with a ring gear 18a of the differential 18 provided in the output shaft 12. Further, the first counter shaft 15 is provided with a pump 5 which is adjacent to the left side of the high side idle gear 15H. Oil pressure-fed from the pump 5 is supplied into a hydraulic circuit including an oil path inlet (not illustrated) provided in the first counter shaft 15 and an oil path inlet 5b provided in the motor shaft 13.

The second counter shaft 16 is provided with two fixed gears 16a and 16b. In the fixed gear 16a close to the right side surface, a left portion is provided with a tooth surface portion normally engaging with the idle gear 13b provided in the motor shaft 13 and a parking gear 19 is integrated with the right side of the tooth surface portion. It is to be noted that, the idle gear 13b has a diameter smaller than that of the fixed gear 16a. That is, the number of teeth of the idle gear 13b is smaller than that of the fixed gear 16a. Meanwhile, the fixed gear 16b close to the left side surface normally engages with the ring gear 18a of the differential 18.

The idle gear 13b of the motor shaft 13 constitutes the connection/disconnection mechanism 20 together with a clutch 21 interposed in the motor shaft 13. That is, the connection/disconnection mechanism 20 of the embodiment is interposed in the motor shaft 13. Specifically, as illustrated in FIG. 3, the clutch 21 of the connection/disconnection mechanism 20 is interposed at a position overlapping the ring gear 18a of the differential 18 in a direction (hereinafter, referred to as a "width direction") orthogonal to the axial direction. Accordingly, it is possible to prevent an increase in axial dimension of the transaxle 1.

The clutch 21 is a multiple disc type clutch which controls the power connection/disconnection state of the motor 3 and includes a first engagement component 22 fixed to the motor shaft 13 and a second engagement component 23 fixed to the idle gear 13b. The first engagement component 22 is one to which power is input from the motor 3 and the second engagement component 23 is one which outputs power to the drive wheel 8. These engagement components 22 and 23 are driven in a separating direction (a disengagement direction) and an approaching direction (an engagement direction) in response to oil flowing from the oil path inlet 5b provided in the motor shaft 13.

When the clutch 21 is engaged, the power of the motor 3 is transmitted to the drive wheel 8 through the idle gear 13b and the fixed gears 16a and 16b and the rotation of the drive wheel 8 is transmitted to the motor 3. That is, when the clutch 21 is engaged, power running and regenerative power generation by the motor 3 becomes possible. In contrast, when the clutch 21 is disengaged while the vehicle travels by the engine 2 (the motor 3 is stopped), the idle gear 13b idly rotates and the rotation of the drive wheel 8 is not transmitted to the motor 3. Accordingly, the motor 3 is not rotated and the resistance is reduced. The clutch 21 of the embodiment is controlled by a hydraulic pressure so as to be engaged during the operation of the motor 3 (in an on state) and to be disengaged during the stop of the motor 3 (in an off state).

It is to be noted that, a configuration may be employed in which a pressure regulator including a plurality of solenoid valves (an on/off solenoid valve, a linear solenoid valve, and the like) are provided on a hydraulic circuit and oil pressure-fed from the pump 5 is adjusted to an appropriate oil pressure so that the connection/disconnection of the clutch 21 is controlled. Alternatively, an electric coupling may be provided instead of the pump 5 and the multiple disc type clutch 21 so that the transmission of power is enabled or disabled by the electric control device. That is, the connection/disconnection mechanism 20 may include the electric coupling and the idle gear 13*b*.

The parking gear 19 is a component which constitutes a parking lock device. When a P range is selected by a driver, the parking gear engages with a parking sprag (not illustrated) to prohibit the rotation of the second counter shaft 16 (that is, the output shaft 12).

As illustrated in FIG. 3, the differential 18 transmits power transmitted to the ring gear 18*a* to the output shaft 12 through a differential casing 18*b*, a pinion shaft 18*c*, a differential pinion 18*d*, and a side gear 18*e*.

3. Operation and Effect (1) Since the transaxle 1 is provided with the connection/disconnection mechanism 20 which enables or disables the transmission of the power of the motor 3, it is possible to prevent the rotation of the drive wheel 8 when the motor 3 is turned off. For this reason, since the weak field control which has been conventionally performed is unnecessary, the electric power consumed for the weak field control can be used for the traveling operation. That is, since the connection/disconnection mechanism 20 is provided, electricity cost can be improved.

(2) Further, conventionally, the motor shaft 13 was provided with only a gear (a gear corresponding to the idle gear 13*b*) for transmitting the power of the motor 3 and a space around the motor shaft 13 was a dead space. In contrast, according to the transaxle 1, since the connection/disconnection mechanism 20 is interposed in the motor shaft 13, the dead space can be used and hence the space efficiency inside the casing 1C can be improved.

(3) Further, in the transaxle 1, since the connection/disconnection mechanism 20 is interposed at a position overlapping the differential 18 in the width direction, a dead space is not formed around the motor shaft 13. That is, since a space around the motor shaft 13 (a space formed as a dead space in the conventional structure) can be efficiently used, space efficiency can be further improved. Accordingly, it is possible to provide the connection/disconnection mechanism 20 without increasing the axial dimension of the transaxle 1.

(4) Further, in the transaxle 1, since the connection/disconnection mechanism 20 includes the idle gear 13*b* and the clutch 21, it is possible to simply enable or disable the transmission of the power of the motor 3 by only controlling the connection/disconnection state of the clutch 21.

(5) In the transaxle 1, the switching mechanism 30 is provided on the power transmission path (the second path 52) from the engine 2 to the output shaft 12 and the high gear stage and the low gear stage are switched in response to the traveling state or the demanded output when the vehicle travels in the parallel mode. That is, since the output of the engine 2 can be transmitted (output) while being switched into two levels in the parallel mode, the number of traveling patterns can be increased. Accordingly, since there is an effect that the drive feeling can be improved or the fuel efficiency can be improved, the vehicle merchantability can be improved.

Further, since the above-described switching mechanism 30 switches the high side idle gear 15H and the low side idle gear 15L by the sleeve 32, the gear ratio is not limited. That is, the gear ratio of each of the high gear stage and the low gear stage can be freely set. Furthermore, in the above-described vehicle 10, since the power of the engine 2 and the power of the motor 3 can be individually output, the torque omission at the time of switching the high/low state can be covered with the power of the motor 3. Accordingly, since it is possible to suppress a shift shock and to decrease the necessity of urgently switching the high/low state, it is possible to simplify the configuration of the switching mechanism 30.

(6) In the transaxle 1 of the embodiment, the high gear stage (the fixed gear 11H, the idle gear 15H) is disposed at the opposite side to the differential 18 with respect to the low gear stage (the fixed gear 11L, the idle gear 15L) inside the casing 1C. That is, since a gear (the idle gear 15L) having a large diameter is disposed at a position close to the differential 18 and a gear (the idle gear 15H) having a small diameter is disposed at a position away from the differential 18 on a shaft (the first counter shaft 15) adjacent to the output shaft 12, a portion along the first counter shaft 15 in the casing 1C can be decreased in diameter, for example, outward (in a direction moving away from the differential 18) so as to be decreased in size on the whole. Accordingly, it is possible to secure a space for connecting the drive shaft 9 on the extension line of the output shaft 12 outside the casing 1C while preventing an increase in size of the casing 1C.

(7) Further, in the transaxle 1 of the embodiment, since the inverter of the generator 4 is controlled so that the rotation speed of the input shaft 11 is adjusted to the rotation speed of the drive wheel 8 in accordance with the movement of the sleeve 32, it is possible to smoothly perform the engagement between the sleeve 32 and the dog gears 15*d* and 15*e* of any one of the idle gears 15H and 15L (that is, the selection of the high gear stage or the low gear stage or the switching of the high gear stage and the low gear stage).

4. Modified Examples

The above-described transaxle 1 is an example and a configuration thereof is not limited to the above-described configuration. Hereinafter, modified examples of the transaxle 1 will be described with reference to FIGS. 5 to 14. FIGS. 5 to 14 are skeleton diagrams illustrating the power train 7 including the transaxle 1 according to first to tenth modified examples. In the components of the above-described embodiment or the modified examples, the same reference numerals as those of the above-described embodiment or the modified examples or the similar reference numerals (reference numerals having the same numbers and different alphabets) will be given to the components and a repetitive description thereof will be omitted.

4-1. First Modified Example

Figure 5:
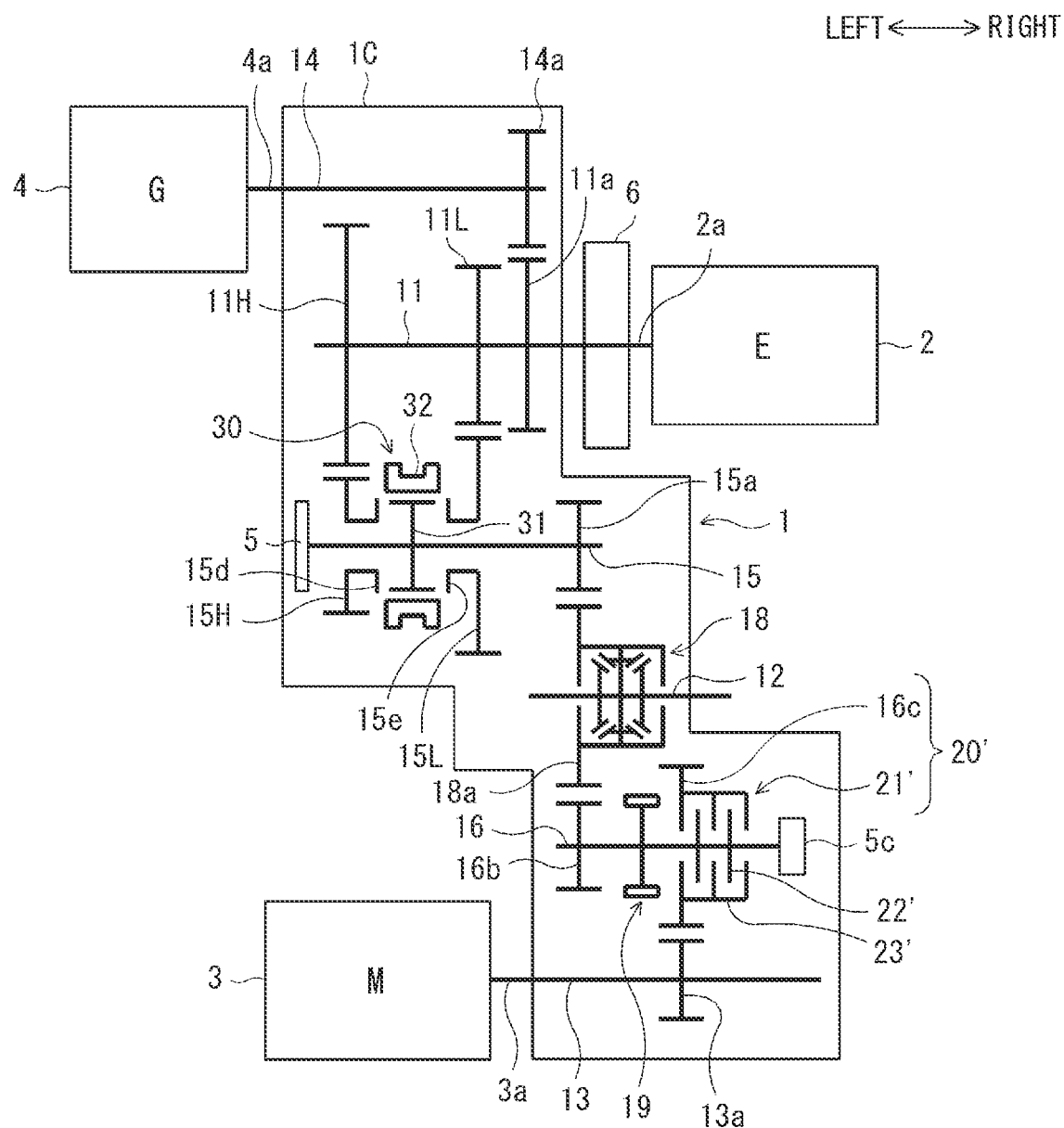
FIG. 5 is a skeleton diagram illustrating a power train according to a first modified example.

As illustrated in FIG. 5, the transaxle 1 according to a first modified example has the same configuration as that of the above-described embodiment except for the structure of connecting the input shaft 11 and the generator shaft 14 and the arrangement of a connection/disconnection mechanism 20' on the second counter shaft 16. In the transaxle 1 of the modified example, a fixed gear 11a normally engaging with the fixed gear 14a of the generator 14 is provided in the input shaft 11 and power can be transmitted between the engine 2 and the generator 4 by the fixed gears 11a and 14a. It is to be noted that, the above-described fixed gear 11L normally engages with only the idle gear 15L of the first counter shaft 15.

Further, the connection/disconnection mechanism 20' of the modified example includes an idle gear 16c which is provided in the second counter shaft 16 and a clutch 21' which is interposed in the second counter shaft 16. The idle gear 16c has a diameter larger than that of the fixed gear 13a provided in the motor shaft 13 (that is, the number of teeth of the idle gear is larger than that of the fixed gear) and normally engages with the fixed gear 13a. Similarly to the above-described embodiment, the clutch 21' is a multiple disc type clutch which controls the power connection/disconnection state of the motor 3 and includes a first engagement component 22' which is fixed to the second counter shaft 16 and a second engagement component 23' which is fixed to the idle gear 16c. These engagement components 22' and 23' are driven in a separating direction (a disengagement direction) and an approaching direction (an engagement direction) in response to the hydraulic pressure of oil flowing from the oil path inlet 5c provided in the second counter shaft 16.

According to the transaxle 1 of the modified example in which the connection/disconnection mechanism 20' is interposed in the second counter shaft 16, since the second counter shaft 16 rotates in synchronization when the output shaft 12 rotates, it is possible to easily supply oil from the end portion (the oil path inlet 5c) of the second counter shaft 16 into the second counter shaft 16 (the idle gear 16c on the second counter shaft 16). Further, in the modified example, since the idle gear 16c having more teeth (a diameter larger) than the fixed gear 13a is provided in the second counter shaft 16, it is possible to decrease the rotation speed of the idle gear 16c as compared with a case in which the idle gear having a small diameter is disposed in the motor shaft 13 (for example, a configuration of FIG. 4). Accordingly, a needle bearing of the idle gear 16c can be used within an allowable rotation speed.

Further, also in the transaxle 1 of the modified example, the electricity cost can be improved similarly to the above-described embodiment. Furthermore, the same effect can be obtained from the same configuration as that of the above-described embodiment. It is to be noted that, since the input shaft 11 of the modified example is provided with the fixed gear 11L transmitting power to the output shaft 12 and the fixed gear 11a transmitting power to the generator 4, it is possible to easily design each gear ratio to a desired value while shortening a dimension in a direction orthogonal to the axial direction (a radial direction of the gear).

4-2. Second Modified Example

Figure 6:
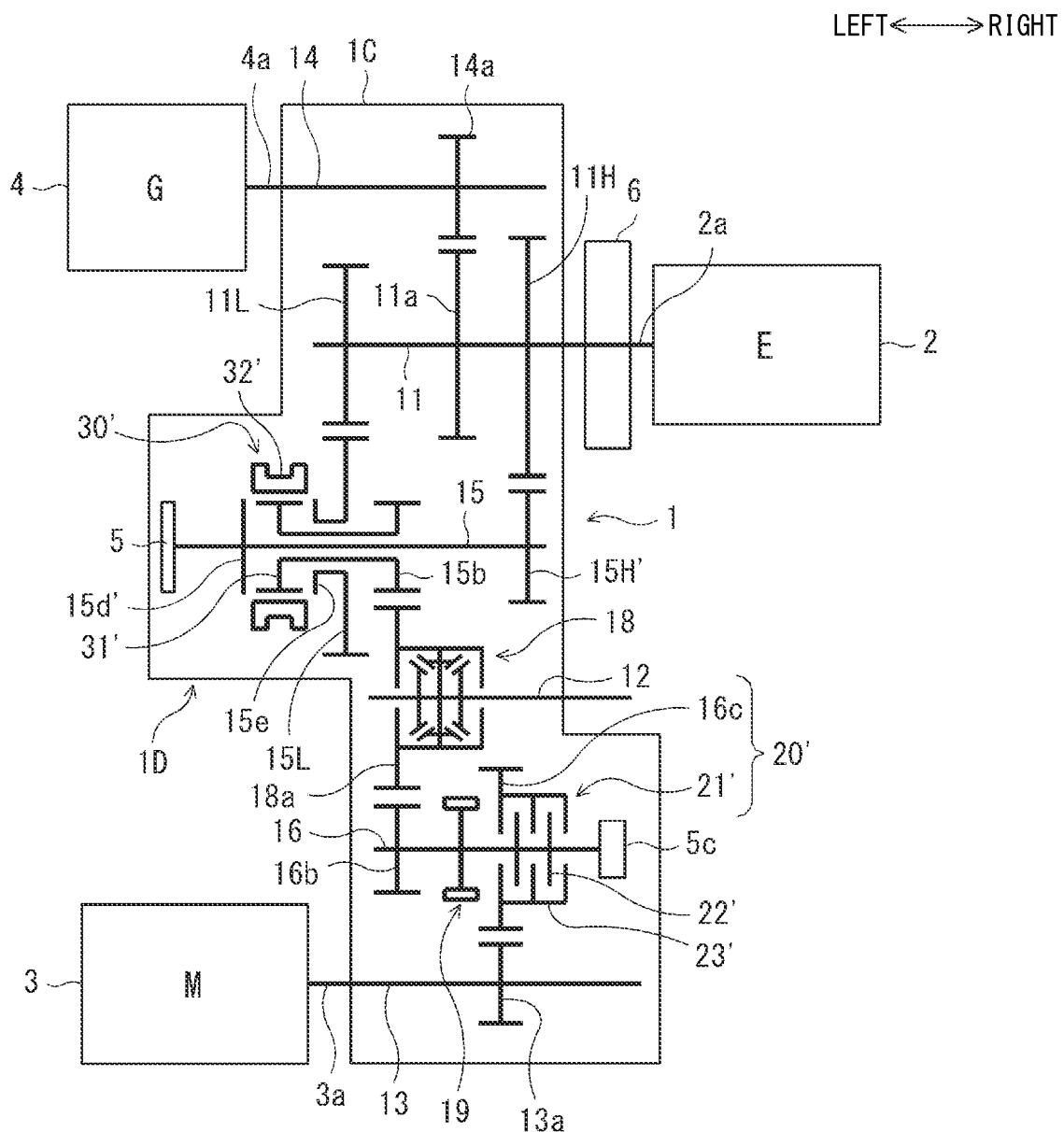
FIG. 6 is a skeleton diagram illustrating a power train according to a second modified example.

As illustrated in FIG. 6, the transaxle 1 according to a second modified example has the same configuration as that of the above-described first modified example (FIG. 5) except that the positional relationship between the high gear stage and the low gear stage and the configuration of a switching mechanism 30' are different. In the modified example, the high gear stage (the fixed gear 11H, a fixed gear 15H') is disposed at the right side (the side of the differential 18) inside the casing 1C and the low gear stage (the fixed gear 11L, the idle gear 15L) is disposed at the left side inside the casing 1C. In the modified example, the fixed gear 15H' provided in the first counter shaft 15 normally engages with the fixed gear 11H of the input shaft 11 to fault the high gear stage.

The input shaft 11 of the modified example is provided with the fixed gear 11a which has the same configuration as that of the first modified example and is disposed between two fixed gears 11L and 11H. Further, the first counter shaft 15 is provided with the high side fixed gear 15H', the output idle gear 15b, the low side idle gear 15L, and the switching mechanism 30' in order from the right side. The switching mechanism 30' includes a hub 31' which is provided in the first counter shaft 15 so as not to be relatively rotatable and an annular sleeve 32' which is combined with the hub 31' so as not to be relatively rotatable and to be slidable in the axial direction of the first counter shaft 15.

Dog gears 15d' and 15e which engage with spline teeth of the sleeve 32' are provided at both left and right sides of the sleeve 32'. In the modified example, the dog gear 15d' at the left side of the sleeve 32' is fixed to the first counter shaft 15 and is rotatable together with the high side fixed gear 15H' through the first counter shaft 15. It is to be noted that, the right dog gear 15e has the same configuration as that of the above-described embodiment. A right portion of the idle gear 15b is provided with a tooth surface portion which engages with the ring gear 18a of the differential 18 and the hub 31' of the switching mechanism 30' is coupled to a front end of a cylindrical portion protruding from the left side of the tooth surface portion (that is, a left portion of the idle gear 15b). The low side idle gear 15L is pivotally supported to the outer periphery of the cylindrical portion of the idle gear 15b so as to be relatively rotatable. That is, these two idle gears 15L and 15b form a double pipe structure.

When the sleeve 32' is located at a neutral position, the output idle gear 15b becomes an idle rotation state and hence the transmission of power of the engine 2 is interrupted. When the sleeve 32' moves to any one of the left and right sides from the neutral position to engage with the dog gears 15d' and 15e at one side, any one of the rotation of the fixed gear 15H' and the rotation of the idle gear 15L is transmitted to the idle gear 15b. That is, when the sleeve 32' moves to the right side to engage with the dog gear 15e of the idle gear 15L, the low gear stage is selected. In contrast, when the sleeve 32' moves to the left side to engage with the dog gear 15d', the high gear stage is selected.

The casing 1C of the modified example is formed in a cylindrical shape in which the periphery of the first counter shaft 15 protrudes outward (leftward) in the axial direction. The cylindrical protrusion portion (hereinafter, referred to as a "cylindrical portion 1D") is formed with an arrangement and a shape not interfering with any of the motor 3 and the generator 4 when the motor 3 and the generator 4 are attached to the casing 1C. The cylindrical portion 1D is disposed in an area between the rotating shaft 3a (the motor shaft 13) of the motor 3 and the rotating shaft 4a (the generator shaft 14) of the generator 4 when a power train 7 is viewed from the left side (in the side view). Here, "the area" above mentioned means an area interposed between two lines orthogonal to a line connecting two shafts 3a and 4a and passing through the shafts 3a and 4a in the side view. The switching mechanism 30' is built in the cylindrical portion 1D.

That is, in the transaxle 1 according to the modified example, since the casing 1C is partially increased in size only at a portion in which the switching mechanism 30' is disposed, an increase in size of the transaxle 1 can be prevented. Further, since the cylindrical portion 1D is disposed in a region between the rotating shafts 3a and 4a of the motor 3 and the generator 4, an increase in size of the power train 7 including the transaxle 1 can be prevented. Furthermore, it is possible to obtain the same effect from the same configuration as those of the above-described embodiment and the first modified example.

4-3. Third Modified Example

Figure 7:
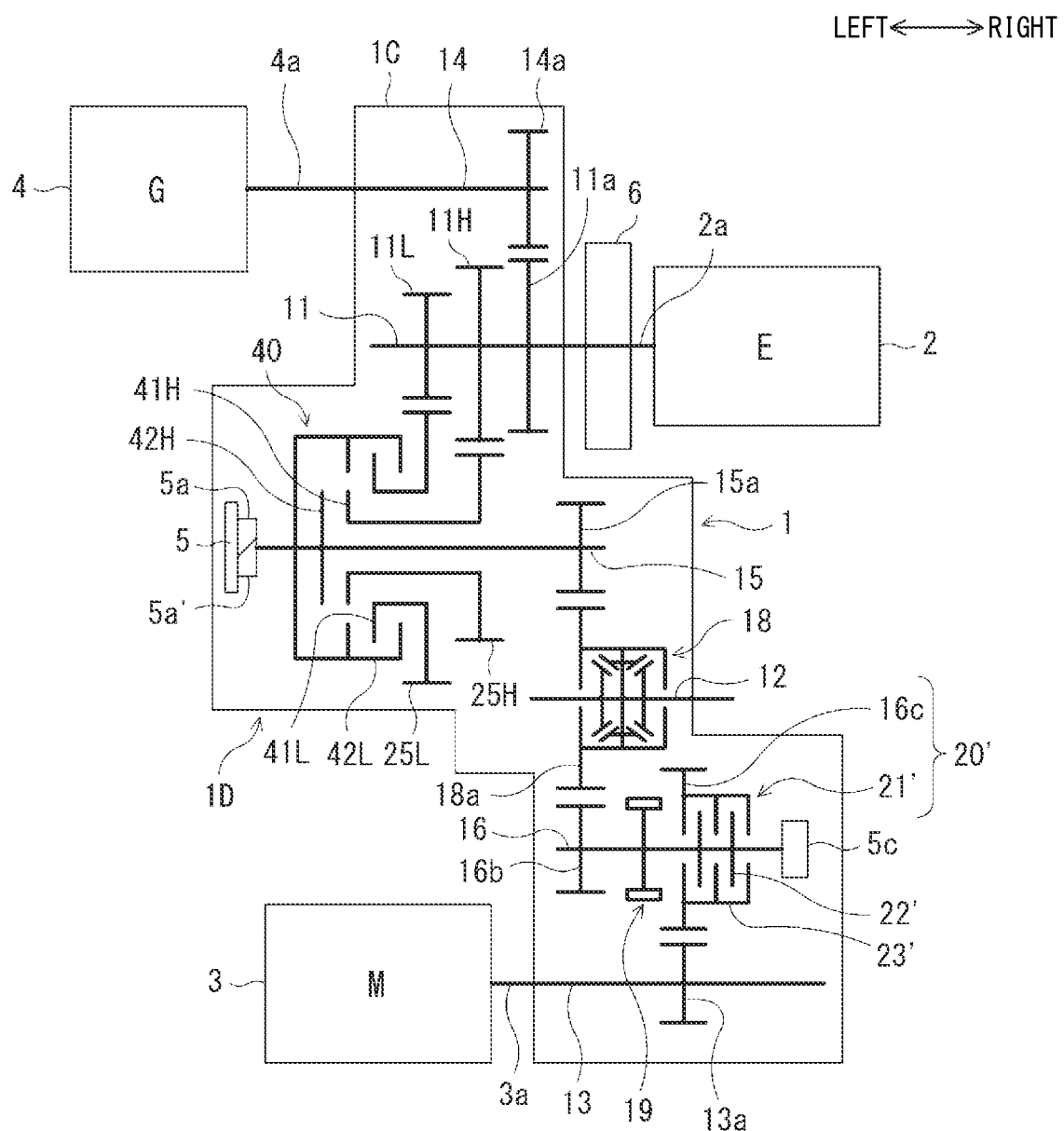
FIG. 7 is a skeleton diagram illustrating a power train according to a third modified example.

As illustrated in FIG. 7, the transaxle 1 according to a third modified example has the same configuration as that of the above-described first modified example (FIG. 5) except that the positional relationship between the high gear stage and the low gear stage and the configuration of a switching mechanism 40 are different. In the modified example, the high gear stage (the fixed gear 11H, an idle gear 25H) is disposed at the right side (the side of the differential 18) inside the casing 1C and the low gear stage (the fixed gear 11L, an idle gear 25L) is disposed at the left side inside the casing 1C. It is to be noted that, the fixed gear 11a which is the same as that of the first modified example is provided at the right side of the high side fixed gear 11H in the input shaft 11 of the modified example.

The first counter shaft 15 is provided with the fixed gear 15a, the high side idle gear 25H, the low side idle gear 25L, and the switching mechanism 40 in order from the right side. The switching mechanism 40 of the modified example is used to control the power connection/disconnection state of the engine 2 and to switch the high gear stage and the low gear stage and is built in the cylindrical portion 1D of the casing 1C similarly to the above-described second modified example. The switching mechanism 40 is obtained by a combination of a high side multiple disc type clutch (a high side clutch) connecting or disconnecting the high gear stage with respect to the second path 52 and a low side multiple disc type clutch (a low side clutch) connecting or disconnecting the low gear stage with respect to the second path 52. The working hydraulic pressure of each clutch is supplied from two oil path inlets 5a and 5a' provided in the first counter shaft 15.

The switching mechanism 40 includes two engagement components 41H and 42H constituting the high side clutch and two engagement components 41L and 42L constituting the low side clutch. The drive side engagement components 41H and 41L are respectively fixed to two idle gears 25H and 25L so that power is input from the engine 2 thereto. Meanwhile, the driven side engagement components 42H and 42L are respectively fixed to the first counter shaft 15 so that power is output to the drive wheel 8.

Two idle gears 25H and 25L are disposed on the same shaft (the first counter shaft 15) to form a double pipe structure. Specifically, in the high side idle gear 25H, a right portion is provided with a tooth surface portion which engages with the fixed gear 11H and an engagement component 41H is fixed to a front end of a cylindrical portion (that is, a left portion of the idle gear 25H) protruding from the left side of the tooth surface portion. Further, in the low side idle gear 25L, an engagement component 41L is fixed to the left side of the tooth surface portion engaging with the fixed gear 11L. Furthermore, the idle gear 25L is pivotally supported to the outer periphery of the cylindrical portion of the high side idle gear 25H so as to be relatively rotatable.

Each of the engagement components 41H and 42H of the high side clutch and the engagement components 41L and 42L of the low side clutch is driven in a separating direction (a disengagement direction) and an approaching direction (an engagement direction) in response to the hydraulic pressure of oil flowing from the oil path inlets 5a and 5a'. When all of the engagement components 41H, 42H, 41L, and 42L of the switching mechanism 40 are disengaged, two idle gears 25H and 25L become an idle rotation state so that the transmission of power of the engine 2 is interrupted. Meanwhile, when one of the high and low side clutches of the switching mechanism 40 is engaged and the other thereof is disengaged, the high gear stage or the low gear stage is selected so that the power of the engine 2 is transmitted to the output shaft 12.

In this way, according to the transaxle 1 of the modified example, since two idle gears 25H and 25L are disposed on the first counter shaft 15 to form a double pipe structure and the high/low state is switched by one switching mechanism 40 interposed in the same shaft, the transaxle 1 can be provided in a compact size. Further, in the transaxle 1 of the modified example, since the casing 1C may be partially increased in size only in a portion in which the switching mechanism 40 is disposed similarly to the above-described second modified example, an increase in size of the transaxle 1 can be prevented. Furthermore, when the cylindrical portion 1D having the switching mechanism 40 built therein is disposed in a region between the rotating shafts 3a and 4a of the motor 3 and the generator 4, an increase in size of the power train 7 including the transaxle 1 can be also prevented. It is to be noted that, it is possible to obtain the same effect from the same configuration as those of the above-described embodiment and the modified examples.

4-4. Fourth Modified Example

Figure 8:
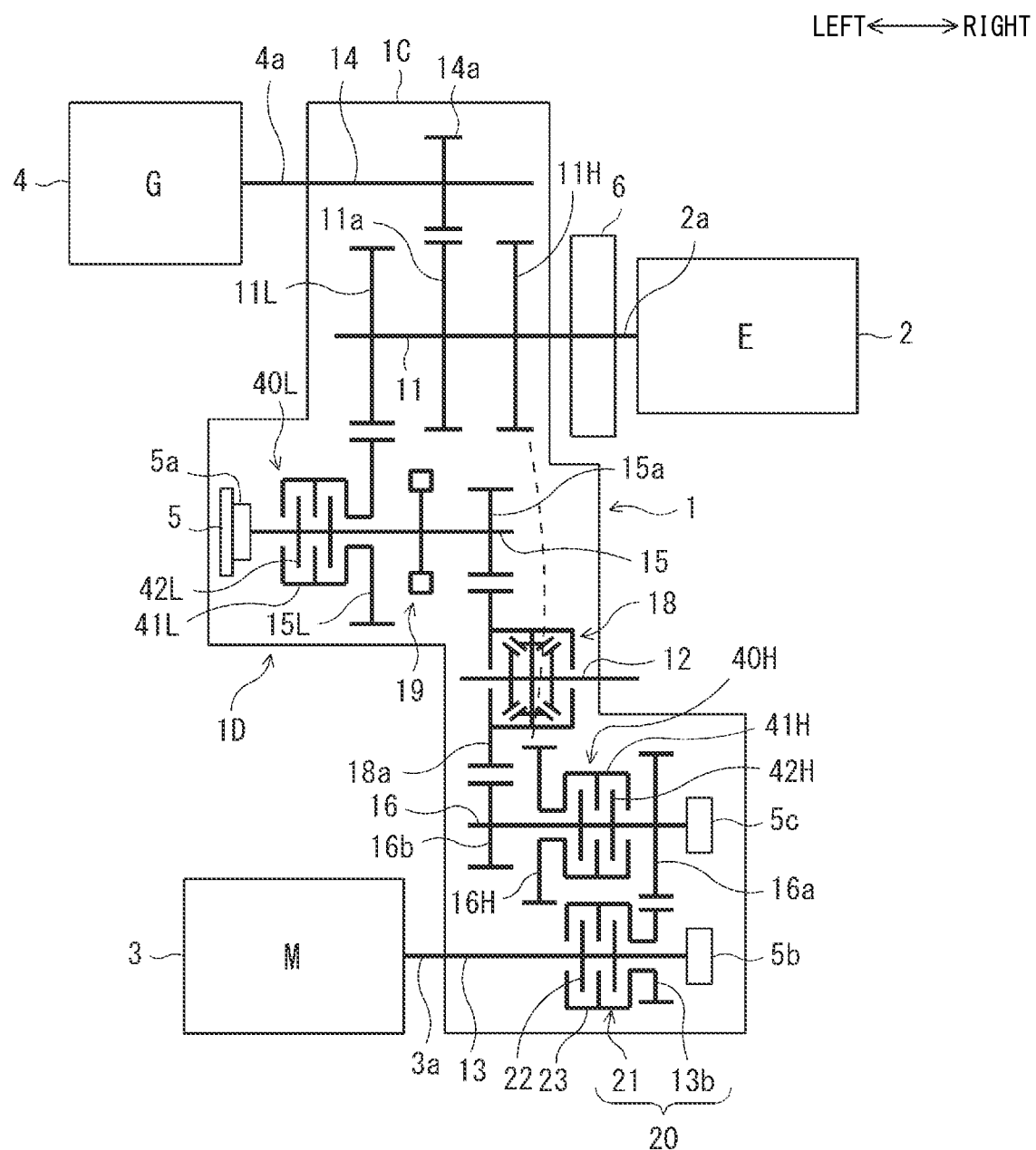
FIG. 8 is a skeleton diagram illustrating a power train according to a fourth modified example.

As illustrated in FIG. 8, in the transaxle 1 according to a fourth modified example, the connection/disconnection mechanism 20 of the above-described embodiment is interposed in the motor shaft 13. Here, the connection/disconnection mechanism 20 of the modified example is interposed at the right side of the ring gear 18a of the differential 18. Further, the transaxle 1 of the modified example is different from those of the above-described embodiment and the modified examples in that the power transmission path from the input shaft 11 to the output shaft 12 is different in the high gear stage and the low gear stage. Furthermore, a dashed line in the drawing indicates a state in which the gears engage with each other.

The high gear stage of the modified example is formed of the high side fixed gear 11H provided in the input shaft 11 and the high side idle gear 16H provided in the second counter shaft 16. That is, the high gear stage is provided on a path extending from the input shaft 11 to the output shaft 12 through the second counter shaft 16. The fixed gear 11H and the idle gear 16H normally engage with each other and the idle gear 16H is connected or disconnected with respect to the second counter shaft 16 by the high side clutch 40H interposed in the second counter shaft 16. It is to be noted that, the second counter shaft 16 of the modified example is disposed in proximity to the input shaft 11 in relation to the position illustrated in FIG. 2.

Similarly to the above-described embodiment, the low gear stage of the modified example is formed of the low side fixed gear 11L provided in the input shaft 11 and the low side idle gear 15L provided in the first counter shaft 15. That is, the low gear stage is provided on a path (the second path 52) extending from the input shaft 11 to the output shaft 12 through the first counter shaft 15. In the input shaft 11 of the modified example, the left end is provided with the low side fixed gear 11L and the right end is provided with the high side fixed gear 11H. In the modified example, the parking gear 19 is provided in the first counter shaft 15, but the arrangement of the parking gear 19 is not particularly limited.

The switching mechanism of the modified example includes the high side clutch 40H and the low side clutch 40L similarly to the third modified example, but is different in that these clutches are separated from each other. As described above, the high side clutch 40H is interposed in the second counter shaft 16 and the low side clutch 40L is interposed in the first counter shaft 15. In the modified example, the high side clutch 40H is disposed at a position located at the right side of the ring gear 18a of the differential 18 and overlapping the clutch 21 on the motor shaft 13 in the width direction. Further, the low side clutch 40L is disposed inside the cylindrical portion 1D.

Similarly to the third modified example, the high side clutch 40H is a multiple disc type clutch including two engagement components 41H and 42H and is driven in a separating direction (a disengagement direction) and an approaching direction (an engagement direction) in response to the hydraulic pressure supplied from the oil path inlet 5c provided in the second counter shaft 16. The low side clutch 40L is also a multiple disc type clutch including two engagement components 41L and 42L and is driven in a separating direction (a disengagement direction) and an approaching direction (an engagement direction) in response to the hydraulic pressure supplied from the oil path inlet 5a.

When all of the high and low side clutches 40H and 40L are disengaged, two idle gears 16H and 15L become an idle rotation state so that the transmission of power of the engine 2 is interrupted. Further, when any one of the high and low side clutches 40H and 40L is engaged and the other thereof is disengaged, the high gear stage or the low gear stage is selected so that the power of the engine 2 is transmitted to the output shaft 12. In this way, according to the transaxle 1 of the modified example, since the high and low side clutches 40H and 40L are provided, the configuration of the switching mechanism can be simplified.

Further, since the casing 1C may be increased in sized only in a portion (the cylindrical portion 1D) in which the low side clutch 40L is disposed similarly to the above-described second modified example, an increase in size of the transaxle 1 can be prevented and an increase in size of the power train 7 including the transaxle 1 can be also prevented. Furthermore, since the high side clutch 40H and the clutch 21 are disposed so as to overlap each other in the width direction, an increase in axial dimension can be prevented and hence an increase in size can be prevented. It is to be noted that, it is possible to obtain the same effect from the same configuration as that of the above-described embodiment.

4-5. Fifth Modified Example

Figure 9:
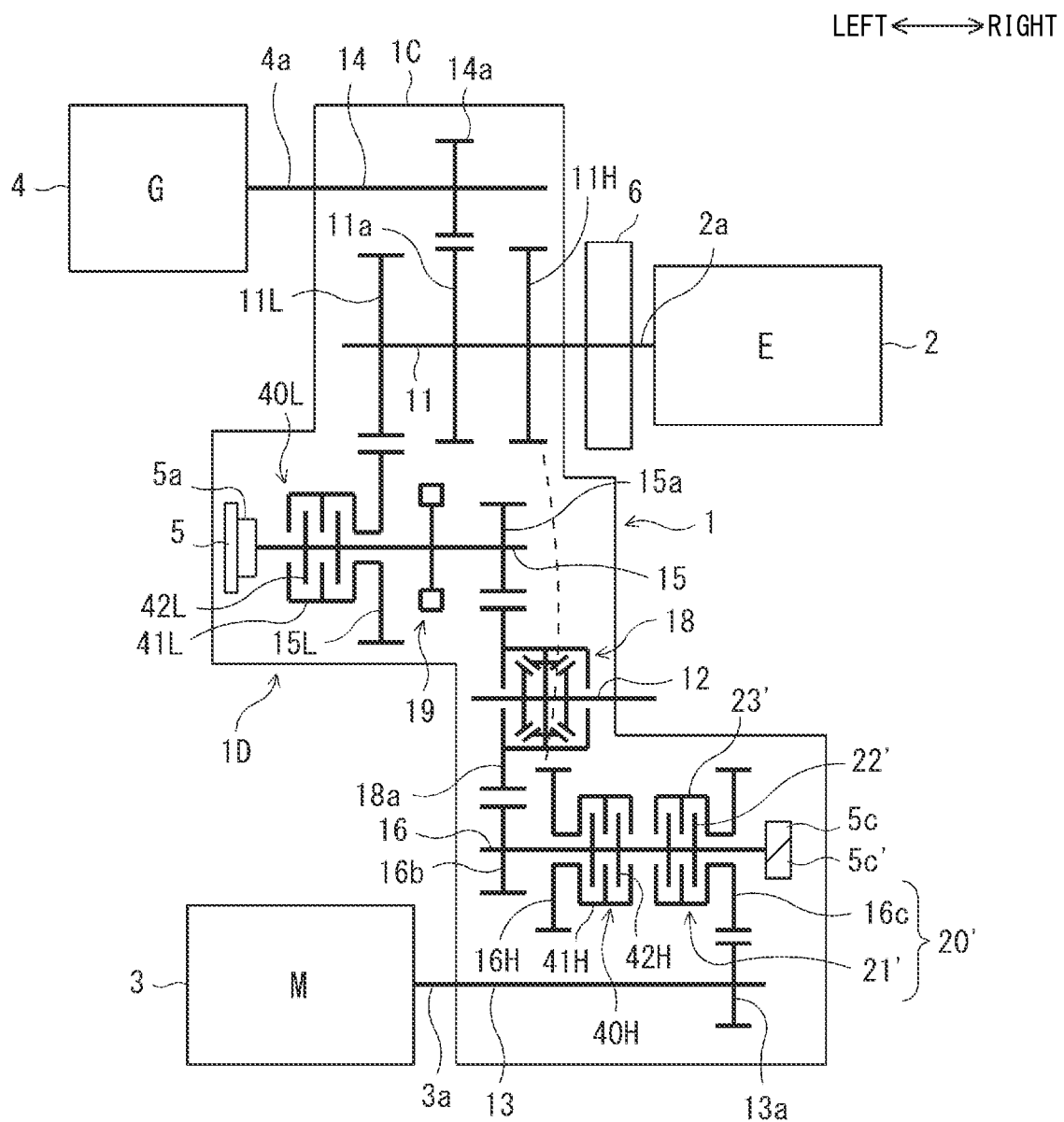
FIG. 9 is a skeleton diagram illustrating a power train according to a fifth modified example.

As illustrated in FIG. 9, the transaxle 1 according to the fifth modified example is different from that of the above-described fourth modified example (FIG. 8) in that the connection/disconnection mechanism 20' is provided in the second counter shaft 16. That is, similarly to the above-described first modified example, in the transaxle 1 of the modified example, the power connection/disconnection state of the motor 3 is controlled by the connection/disconnection mechanism 20' including the clutch 21' and the idle gear 16c provided in the second counter shaft 16. It is to be noted that, the second counter shaft 16 is provided with oil path inlets 5c and 5c' respectively supplying a hydraulic pressure to the clutch 21' and the high side clutch 40H. Also in such a configuration, it is possible to obtain the same effect from the same configuration as those of the above-described embodiment and the first and fourth modified examples.

4-6. Sixth Modified Example

Figure 10:
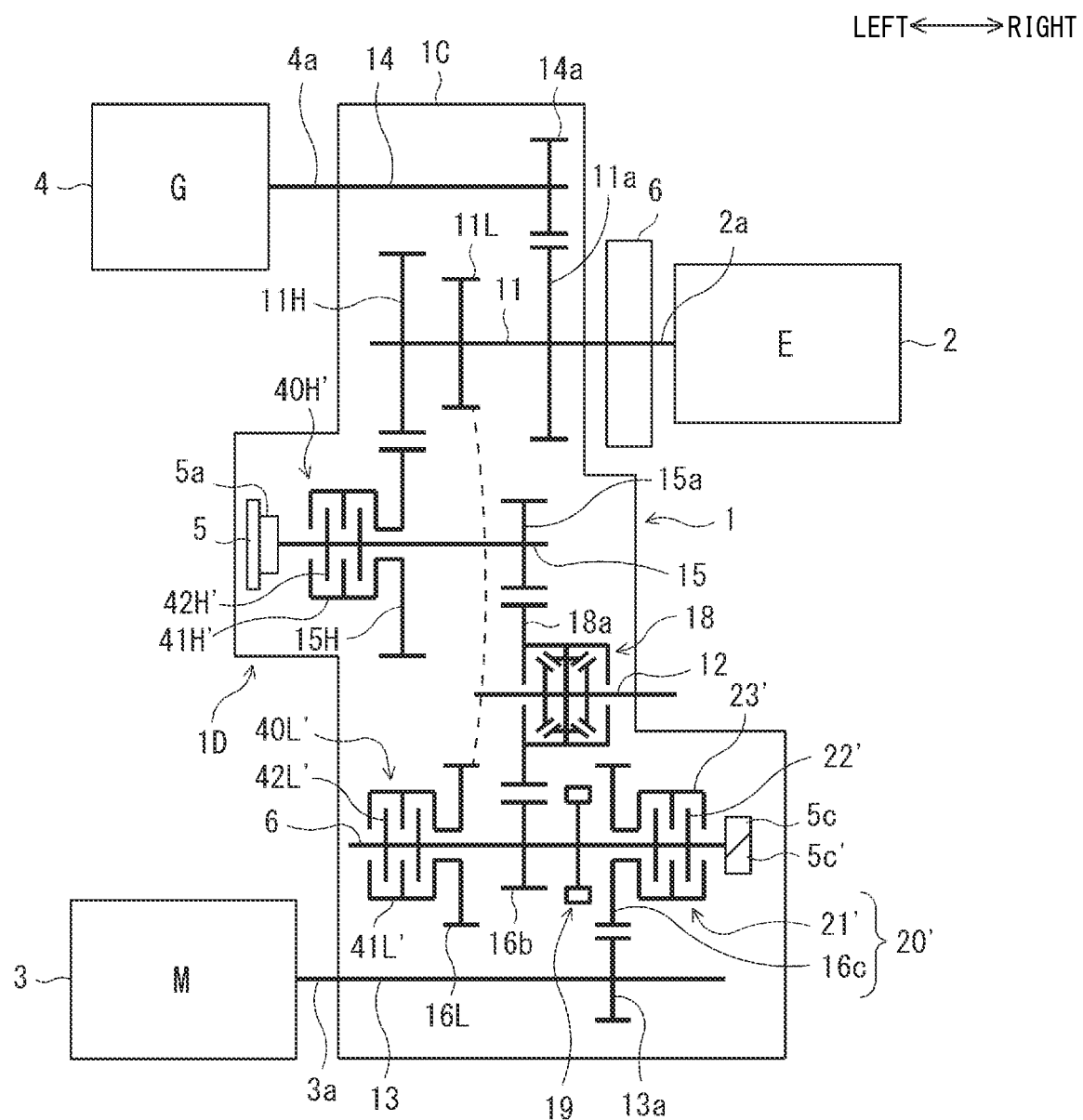
FIG. 10 is a skeleton diagram illustrating a power train according to a sixth modified example.

As illustrated in FIG. 10, in the transaxle 1 according to a sixth modified example, the connection/disconnection mechanism 20' of the above-described first modified example (FIG. 5) is interposed in the second counter shaft 16. Further, similarly to the above-described fourth modified example (FIG. 8), the transaxle 1 is provided so that the power transmission path extending from the input shaft 11 to the output shaft 12 is different for the high gear stage and the low gear stage, but the arrangement is different from that of the fourth modified example. Furthermore, similarly to the fourth modified example, the switching mechanism of the modified example the high side clutch 40H' and the low side clutch 40L' are separated from each other.

Similarly to the above-described embodiment, the high gear stage of the modified example is formed of the high side fixed gear 11H provided in the input shaft 11 and the high side idle gear 15H provided in the first counter shaft 15. The high side clutch 40H' is used to connect or disconnect the idle gear 15H with respect to the first counter shaft 15 and is disposed inside the cylindrical portion 1D on the first counter shaft 15. The high side clutch 40H' is a multiple disc type clutch including two engagement components 41H' and 42H' and is driven in a separating direction (a disengagement direction) and an approaching direction (an engagement direction) in response to the hydraulic pressure supplied from the oil path inlet 5a.

The low gear stage of the modified example is formed of the low side fixed gear 11L provided in the input shaft 11 and the low side idle gear 16L provided in the second counter shaft 16. That is, the low gear stage is provided on a path extending from the input shaft 11 to the output shaft 12 through the second counter shaft 16. The fixed gear 11L and the idle gear 16L normally engage with each other and the idle gear 16L is connected or disconnected with respect to the second counter shaft 16 by the low side clutch 40L' interposed in the second counter shaft 16.

The low side clutch 40L' is a multiple disc type clutch including two engagement components 41L' and 42L' and is driven in a separating direction (a disengagement direction) and an approaching direction (an engagement direction) in response to the hydraulic pressure supplied from the oil path inlet 5c. In the input shaft 11 of the modified example, the high side fixed gear 11H is provided at the left end and the low side fixed gear 11L is provided adjacent to the right side of the fixed gear 11H. Further, the low side clutch 40L' is disposed at the left side of the fixed gear 16b engaging with the ring gear 18a of the differential 18.

Similarly to the above-described fourth modified example, when the high and low side clutches 40H' and 40L' are disengaged, the transmission of power of the engine 2 is interrupted. Further, when any one of the high and low side clutches 40H' and 40L' is engaged and the other thereof is disengaged, the high gear stage or the low gear stage is selected so that the power of the engine 2 is transmitted to the output shaft 12. In this way, also in the transaxle 1 of the modified example, it is possible to obtain the same effect from the same configuration as those of the above-described embodiment and the modified examples.

4-7. Seventh Modified Example

Figure 11:
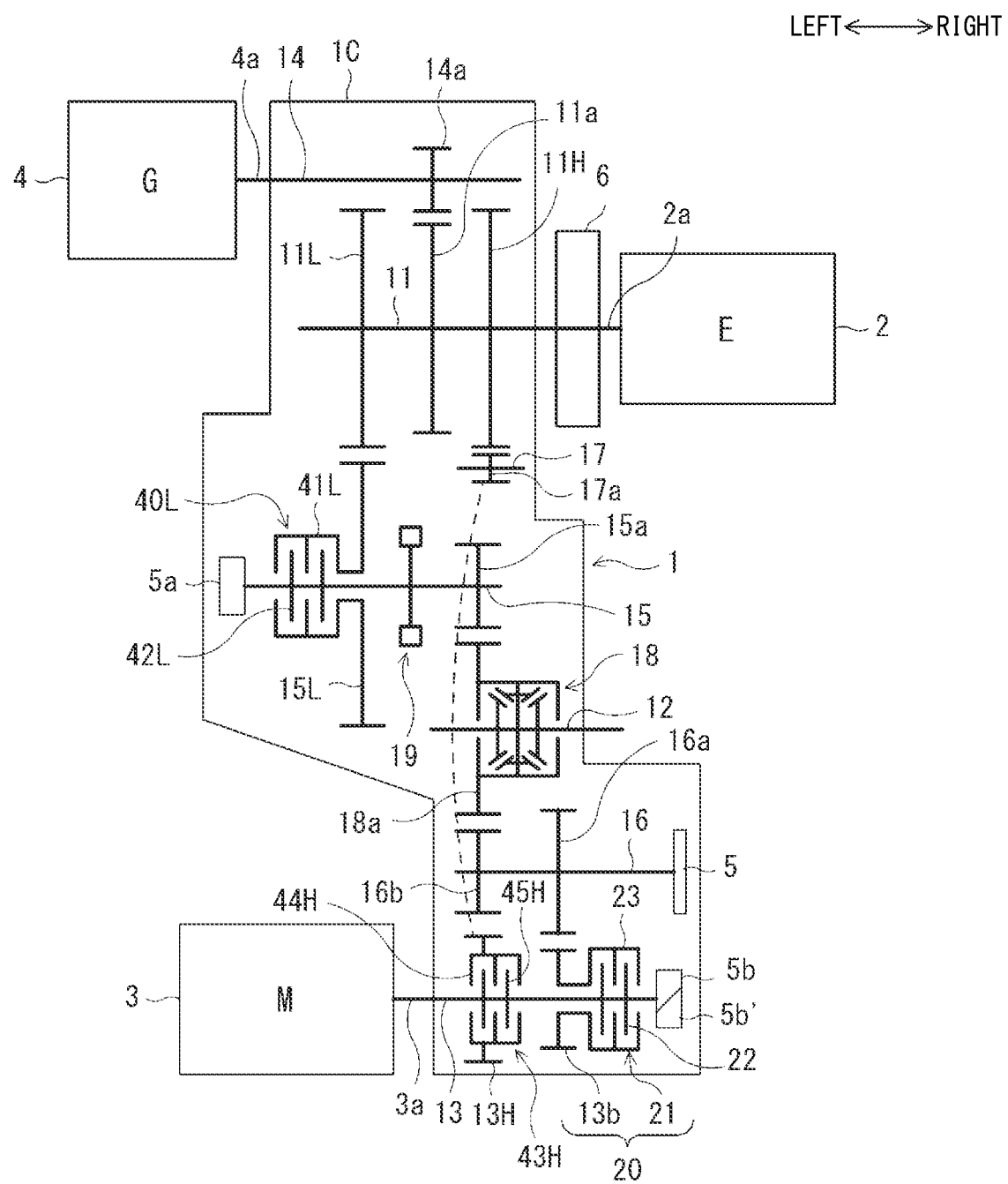
FIG. 11 is a skeleton diagram illustrating a power train according to a seventh modified example.

As illustrated in FIG. 11, in the transaxle 1 according to a seventh modified example, the connection/disconnection mechanism 20 is interposed in the motor shaft 13 similarly to the above-described embodiment (FIGS. 3 and 4). Here, the modified example is different from the above-described embodiment in that the clutch 21 is provided at the right side of the idle gear 13b and the engagement timing of the clutch 21 is different. Further, similarly to the above-described fourth modified example (FIG. 8), the transaxle 1 is provided so that the power transmission path extending from the input shaft 11 to the output shaft 12 is different for the high gear stage and the low gear stage. Here, the power transmission path of the high gear stage is different from that of the fourth modified example.

The high gear stage of the modified example is formed of the high side fixed gear 11H provided in the input shaft 11, the high side idle gear 13H provided in the motor shaft 13, and the idle gear 17a provided therebetween. The idle gear 17a is a gear for matching the rotation direction, is disposed in parallel to six shafts 11 to 16, and is fixed to an intermediate shaft 17 provided between the input shaft 11 and the motor shaft 13. All of the fixed gear 11H and the idle gear 13H normally engage with the idle gear 17a.

In the motor shaft 13, a high side clutch 43H is provided at the left side of the connection/disconnection mechanism 20. The high side clutch 43H is used to connect or disconnect the idle gear 13H with respect to the motor shaft 13 and is disposed at a position overlapping the ring gear 18a of the differential 18 in the width direction. That is, the high gear stage of the modified example is provided on a path extending from the input shaft 11 to the output shaft 12 through the intermediate shaft 17, the motor shaft 13, and the second counter shaft 16. The high side clutch 43H is also a multiple disc type clutch including two engagement components 44H and 45H and is driven in a separating direction (a disengagement direction) and an approaching direction (an engagement direction) in response to the hydraulic pressure supplied from the oil path inlet 5b' provided in the motor shaft 13.

When all of the high and low side clutches 43H and 40L are disengaged, two idle gears 13H and 15L become an idle rotation state so that the transmission of power of the engine 2 is interrupted. Further, when any one of the high and low side clutches 43H and 40L is engaged and the other thereof is disengaged, the high gear stage or the low gear stage is selected. Here, the clutch 21 of the modified example is controlled by the hydraulic pressure so as to be engaged when the high gear stage is selected even when the motor 3 is stopped (in an off state) in addition to the operation state of the motor 3. Accordingly, the power of the engine 2 is transmitted to the output shaft 12. Furthermore, at least the low gear stage is selected when the clutch 21 is disengaged.

Thus, according to the transaxle 1 of the modified example, since the power transmission path of the motor 3 is disconnected by the connection/disconnection mechanism 20 while the motor 3 is stopped and the low gear stage is selected, it is possible to prevent the rotation of the motor 3 and to contribute to the improvement in electricity cost. Further, also in the modified example, since the dead space can be efficiently used, the high gear stage or the low gear stage can be set without increasing the axial dimension of the transaxle 1. Furthermore, it is possible to obtain the same effect from the same configuration as those of the above-described embodiment and the modified examples.

4-8. Eighth Modified Example

Figure 12:
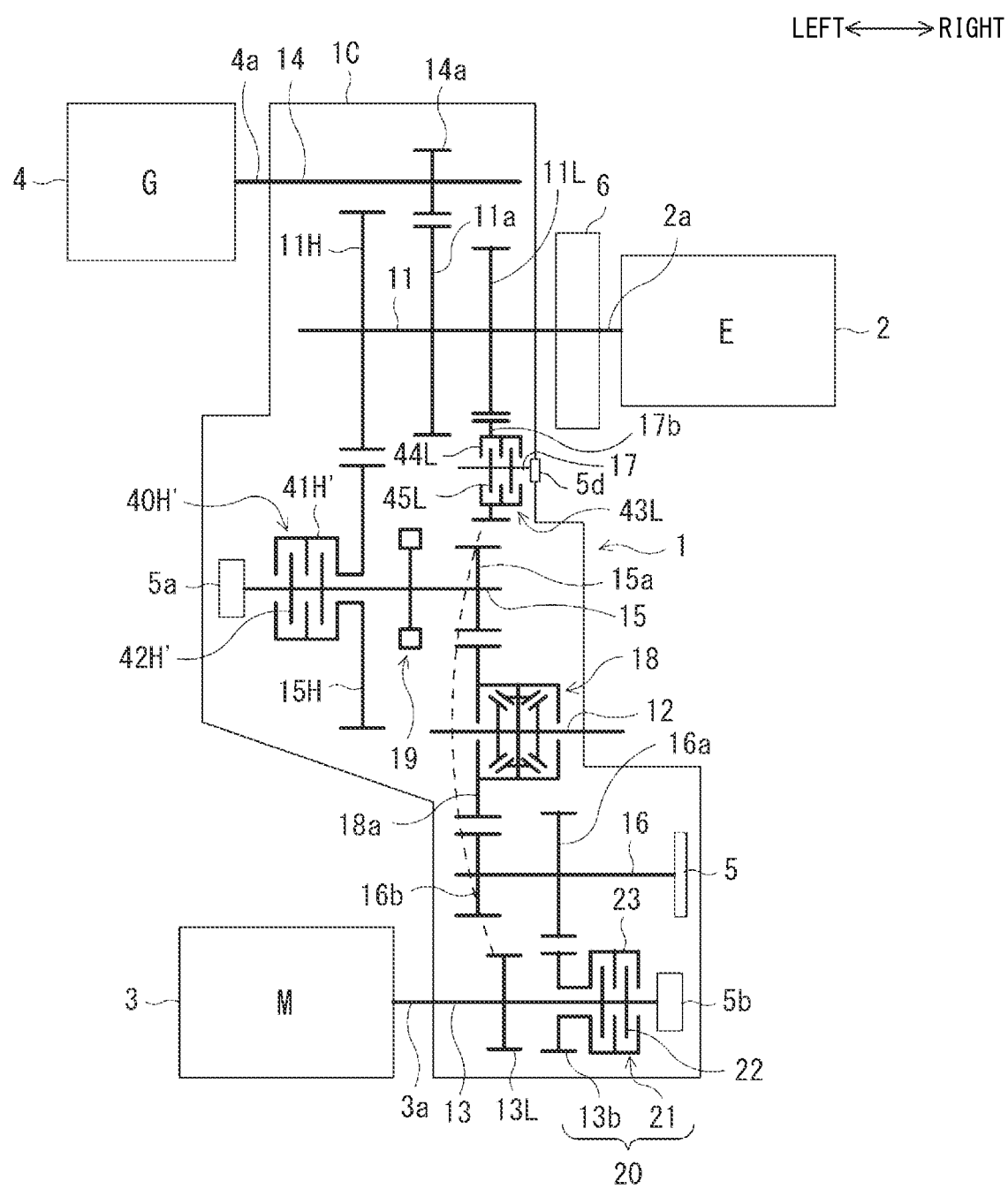
FIG. 12 is a skeleton diagram illustrating a power train according to an eighth modified example.

As illustrated in FIG. 12, in the transaxle 1 according to an eighth modified example, the connection/disconnection mechanism 20 which is the same as that of the above-described seventh modified example is interposed in the motor shaft 13. Further, the transaxle 1 is different from that of the above-described seventh modified example (FIG. 11) in that the positional relationship between the high gear stage and the low gear stage is different and a switching mechanism 43L is provided in the intermediate shaft 17.

Similarly to the above-described embodiment, in the transaxle 1, the low gear stage is disposed at the right side and the high gear stage is disposed at the left side. Furthermore, the configuration of the high gear stage is the same as that of the sixth modified example. The low gear stage of the modified example includes the low side fixed gear 11L provided in the input shaft 11, a low side fixed gear 13L provided in the motor shaft 13, and an idle gear 17b provided therebetween. The idle gear 17b is a gear provided in the intermediate shaft 17 to match the rotation direction similarly to the seventh modified example. Here, the idle gear 17b is provided as an idle gear differently from the seventh modified example. Furthermore, both fixed gears 11L and 13L normally engage with the idle gear 17b.

The low side clutch 43L interposed in the intermediate shaft is a multiple disc type clutch including two engagement components 44L and 45L and is driven in a separating direction (a disengagement direction) and an approaching direction (an engagement direction) in response to the hydraulic pressure supplied from the oil path inlet 5d in the intermediate shaft 17. The idle gear 17b is fixed to the engagement component 44L and the low side clutch 43L connects or disconnects the idle gear 17b with respect to the intermediate shaft 17.

When both high and low side clutches 40H' and 43L are disengaged, two idle gears 15H and 17b become an idle rotation state so that the transmission of power of the engine 2 is interrupted. Further, when any one of the high and low side clutches 40H' and 43L is engaged or the other thereof is disengaged, the high gear stage or the low gear stage is selected. Here, the clutch 21 of the modified example is controlled by the hydraulic pressure so as to be engaged when the low gear stage is selected even when the motor 3 is stopped (in an off state) in addition to the operation state of the motor 3. Accordingly, the power of the engine 2 is transmitted to the output shaft 12. Furthermore, the clutch 21 is disengaged when at least the high gear stage is selected.

Thus, according to the transaxle 1 of the modified example, since the power transmission path of the motor 3 is disengaged by the connection/disconnection mechanism 20 while the motor 3 is stopped and the high gear stage is selected, it is possible to prevent the rotation of the motor 3 and to contribute to the improvement in electricity cost. Further, also in the modified example, since it is possible to efficiently use the dead space, it is possible to set the high gear stage or the low gear stage without increasing the axial dimension of the transaxle 1. Furthermore, it is possible to obtain the same effect from the same configuration as those of the above-described embodiment and the modified examples.

4-9. Ninth Modified Example

Figure 13:
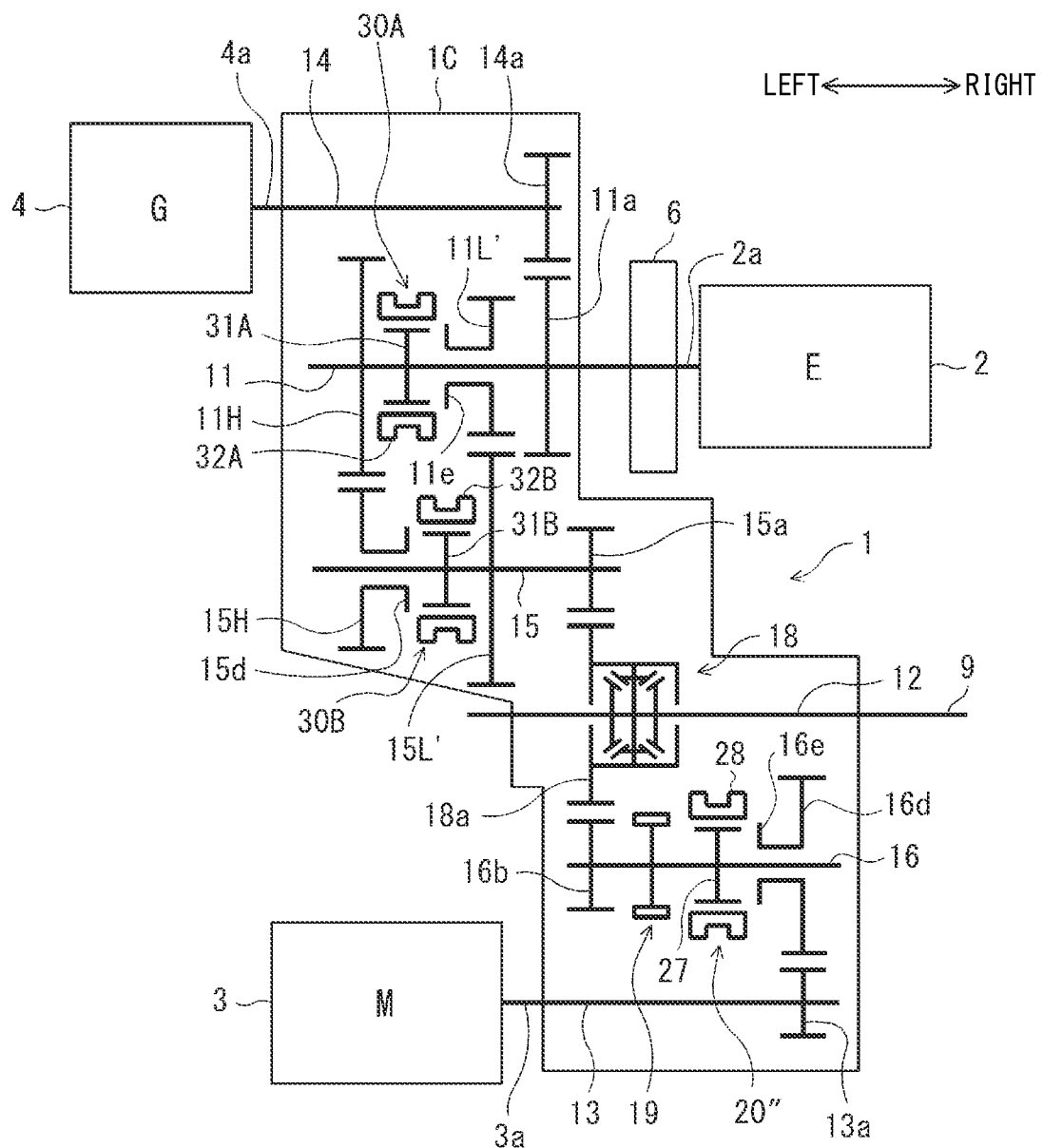
FIG. 13 is a skeleton diagram illustrating a power train according to a ninth modified example.

As illustrated in FIG. 13, the transaxle 1 according to a ninth modified example has the same configuration as that of the above-described first modified example (FIG. 5) except that the configuration of the switching mechanism and the configuration of the connection/disconnection mechanism are different.

First, the switching mechanism of the modified example will be described. The switching mechanism includes two selection mechanisms 30A and 30B respectively selecting the high gear stage and the low gear stage. One selection mechanism 30A is interposed in the input shaft 11 and the other selection mechanism 30B is interposed in the first counter shaft 15. Further, these selection mechanisms 30A and 30B are disposed at an overlapping position in the width direction.

The selection mechanism 30A includes a hub 31A which is fixed to the input shaft 11 and an annular sleeve 32A which is combined with the hub 31A (the input shaft 11) so as not to be relatively rotatable and to be slidable in the axial direction of the input shaft 11. Similarly, the selection mechanism 30B includes a hub 31B which is fixed to the first counter shaft 15 and an annular sleeve 32B which is combined with the hub 31B (the first counter shaft 15) so as not to be relatively rotatable and to be slidable in the axial direction of the first counter shaft 15. These sleeves 32A and 32B also include spline teeth (not illustrated) provided at the inside in the radial direction.

Further, in the input shaft 11, the fixed gear 11H is provided at the left side of the selection mechanism 30A and an idle gear 11L' having a small number of teeth as compared with the fixed gear 11H is provided at the right side of the selection mechanism 30A. Furthermore, in the first counter shaft 15, the idle gear 15H is provided at the left side of the selection mechanism 30B and a fixed gear 15L' having a large number of teeth as compared with the idle gear 15H is provided at the right side of the selection mechanism 30B. The fixed gear 11L' and the idle gear 15L' normally engage with each other. Further, in the idle gear 11L', a right portion is provided with a tooth surface portion which engages with the fixed gear 15L' and a dog gear 11e is provided to be coupled to a contact portion protruding from the left side of the tooth surface portion. Furthermore, the dog gear 11e also includes dogteeth (not illustrated) provided at a front end portion thereof.

When all of sleeves 32A and 32B are located at a neutral position, two idle gears 15H and 11L' become an idle rotation state so that the transmission of power of the engine 2 is interrupted. When the sleeve 32A moves rightward from an idle rotation state to engage with the dog gear 11e of the idle gear 11L' while the sleeve 32B is located at the neutral position, the power of the engine 2 (the rotation of the input shaft 11) is transmitted to the output shaft 12 through the idle gear 11L' and the fixed gear 15L'. That is, in this case, the idle gear 11L' of the low gear stage enters the rotational connection state with respect to the input shaft 11. Further, when the sleeve 32B moves leftward from an idle rotation state to engage with the dog gear 15d of the idle gear 15H while the sleeve 32A is located at the neutral position, the power of the engine 2 is transmitted to the output shaft 12 through the fixed gear 11H and the idle gear 15H. That is, in this case, the idle gear 15H of the high gear stage enters the rotational connection state with respect to the first counter shaft 15.

In this way, according to the transaxle 1 of the modified example, since one of two selection mechanisms 30A and 30B constituting the switching mechanism is disposed on the input shaft 11, loss caused by an oil bath can be prevented. Further, since it is possible to switch the high/low state by simultaneously operating two selection mechanisms 30A and 30B, it is possible to shorten a time for switching the high/low state as compared with a case in which one switching mechanism 20 is provided and to promptly switch the high/low state.

Next, a connection/disconnection mechanism 20" of the modified example will be described. The connection/disconnection mechanism 20" includes a hub 27 which is fixed to the second counter shaft 16 and an annular sleeve 28 which is combined with the hub 27 (the second counter shaft 16) so as not to be relatively rotatable and to be slidable in the axial direction. Spline teeth (not illustrated) are provided at the inside of the sleeve 28 in the radial direction. Further, in the second counter shaft 16, an idle gear 16d is provided at the right side of the connection/disconnection mechanism 20". The number of teeth of the idle gear 16d is larger than that of the fixed gear 13a of the motor shaft 13, a right portion thereof is provided with a tooth surface portion normally engaging with the fixed gear 13a, and a dog gear 16e is provided to be coupled to a contact portion protruding from the left side of the tooth surface portion. Furthermore, the dog gear 16e also includes dog teeth (not illustrated) provided at a front end portion thereof.

When the sleeve 28 is located at a neutral position, the idle gear 16d becomes an idle rotation state so that the transmission of power of the first path 51 is interrupted. When the sleeve 28 moves in the axial direction (rightward) to engage with the dog gear 16e of the idle gear 16d, the idle gear 16d enters the rotational connection state with respect to the second counter shaft 16 so that power can be transmitted through the first path 51. That is, the power of the motor 3 is transmitted to the output shaft 12.

In this way, according to the transaxle 1 of the modified example, since it is possible to switch the power transmission state by the sleeve 28, a gear ratio is not limited and a degree of freedom in design can be improved. Further, in the modified example, since the connection/disconnection mechanism 20" and the idle gear 16d are interposed in the second counter shaft 16, the idle gear 16d idly rotates even when the second counter shaft 16 rotates in accordance with the rotation of the output shaft 12. For this reason, even when a part or all of the idle gear 16d is in an oil bath state, oil inside the transaxle 1 is not stirred and hence the efficiency of the transaxle 1 is not deteriorated.

It is to be noted that, it is possible to obtain the same effect from the same configuration as those of the above-described embodiment and the modified examples. Further, in the modified example, a configuration in which the connection/disconnection mechanism 20" is interposed in the second counter shaft 16 has been disclosed, but the connection/disconnection mechanism including the hub 27 and the sleeve 28 may be provided in a shaft (for example, the motor shaft 13) on the first path 51.

4-10. Tenth Modified Example

Figure 14:
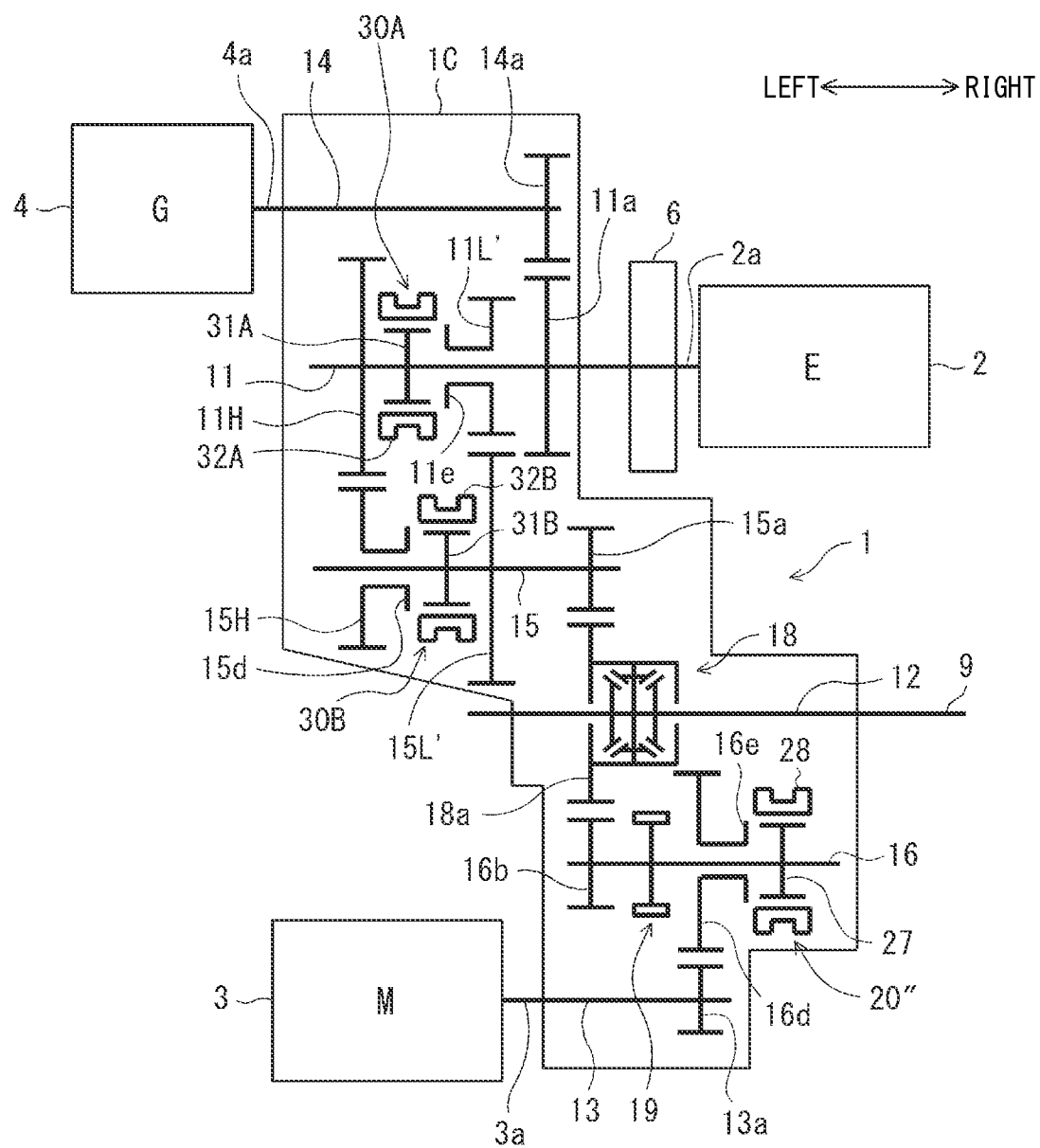
FIG. 14 is a skeleton diagram illustrating a power train according to a tenth modified example.

As illustrated in FIG. 14, the transaxle 1 according to a tenth modified example has the same configuration as that of the above-described ninth modified example (FIG. 13) except for the positional relationship between the idle gear 16d and the connection/disconnection mechanism 20" on the second counter shaft 16. That is, in the modified example, the idle gear 16d is disposed at the left side of the connection/disconnection mechanism 20" (at a side close to the differential 18). According to the transaxle 1 with such an arrangement, since the position of the fixed gear 13a on the motor shaft 13 is closer to the motor 3 as compared with FIG. 13, it is possible to shorten the length of the motor shaft 13 and to decrease the size of the casing 1C. Furthermore, it is possible to obtain the same effect from the same configuration as those of the above-described embodiment and the modified examples.

5. Others

While the embodiment and the modified examples of the invention have been described, the invention is not limited to the above-described embodiment and the like and can be modified into various forms without departing from the gist of the invention.

In the above-described embodiment and the modified examples, the transaxle 1 in which the switching mechanism (or a part of the switching mechanism) for switching the high gear stage and the low gear stage is interposed in the first counter shaft 15 has been exemplified, but the arrangement of the switching mechanism is not particularly limited. For example, the switching mechanism may be interposed in the input shaft 11. The switching mechanism is not an indispensable configuration and can be omitted.

Further, in the above-described embodiment, a configuration is exemplified in which the connection/disconnection mechanism 20 is disposed at a position overlapping the ring gear 18a of the differential 18 in the width direction, but the position of the connection/disconnection mechanism 20 is not limited thereto. For example, the connection/disconnection mechanism may be disposed at a position overlapping a component (the differential casing 18b or the differential pinion 18d) other than the ring gear 18a of the differential 18 in the width direction or may be disposed so as not to overlap the differential 18. Further, in the above-described embodiment and the first to eighth modified examples, a case in which the connection/disconnection mechanisms 20 and 20' include the idle gear and the clutch has been exemplified, but the connection/disconnection mechanisms 20 and 20' of the above-described embodiment and the first to eighth modified examples may be replaced by the connection/disconnection mechanism 20" of the ninth and tenth modified examples (that is, a connection/disconnection mechanism using a sleeve instead of a clutch).

Further, the relative positions of the engine 2, the motor 3, the generator 4, and the pump 5 with respect to the transaxle 1 are not limited to the above-described examples. In response to the relative positions, the arrangement of six shafts 11 to 16 inside the transaxle 1 may be set. Furthermore, the arrangement of the gears provided in the shafts inside the transaxle 1 is also exemplary and is not limited to the above-described example.

REFERENCE SIGNS LIST

1 Transaxle (Transaxle Device)
2 Engine
3 Motor (Electric Motor, First Rotating Electric Machine)
3a Rotating Shaft
4 Generator (Electric Power Generator, Second Rotating Electric Machine)
8 Drive Wheel
10 Vehicle
12 Output Shaft
13 Motor Shaft (First Rotating Electric Machine Shaft)
13a Fixed Gear (First Gear)
13b Idle Gear (First Gear)
16 Second Counter Shaft (Counter Shaft)
16a Fixed Gear (Second Gear)
16b Fixed Gear
16c Idle Gear (Second Gear)
16d Idle Gear (Second Gear)
16H, 16L Idle Gear
18 Differential (Differential Gear)
20, 20', 20" Connection/Disconnection Mechanism
21, 21' Clutch
22, 22' First Engagement Component
23, 23' Second Engagement Component
28 Sleeve
30, 30', 40 Switching Mechanism
32, 32', 32A, 32B Sleeve
40H, 40H', 43H High Side Clutch (Switching Mechanism)
40L, 40L', 43L Low Side Clutch (Switching Mechanism)
51 First Path (First Power Transmission Path)
52 Second Path (Second Power Transmission Path)

The invention claimed is:

1. A transaxle device for a hybrid vehicle including an engine, a first rotating electric machine, and a second rotating electric machine and operable to individually transmit power of the engine and power of the first rotating electric machine to an output shaft on a drive wheel side from different power transmission paths and also to transmit the power of the engine to the second rotating electric machine, the transaxle device comprising:
 a connection/disconnection mechanism which is provided on a first power transmission path from the first rotating electric machine to the output shaft and enables or disables the transmission of the power of the first rotating electric machine,
 wherein the connection/disconnection mechanism includes an annular sleeve which is combined with a shaft provided on the first power transmission path so as not to be relatively rotatable and to be slidable in an axial direction, and
 wherein the sleeve turns the idle gear rotatable relative to the shaft into a rotational connection state with respect to the shaft by moving in the axial direction.

2. The transaxle device according to claim 1,
 wherein the first power transmission path is provided with a first rotating electric machine shaft coaxially connected to a rotating shaft of the first rotating electric machine and a counter shaft located between the first rotating electric machine shaft and the output shaft, and
 wherein the connection/disconnection mechanism is interposed in the counter shaft.

3. The transaxle device according to claim 2,
 wherein a fixed gear on the first rotating electric machine shaft normally engages with an idle gear on the counter shaft and the number of teeth of the idle gear is larger than the number of teeth of the fixed gear.

4. The transaxle device according to claim 1, further comprising:
 a switching mechanism which includes a sleeve or a clutch interposed on a second power transmission path from the engine to the output shaft and switches a high gear stage and a low gear stage.

5. The transaxle device according to claim 2, further comprising:
 a switching mechanism which includes a sleeve or a clutch interposed on a second power transmission path from the engine to the output shaft and switches a high gear stage and a low gear stage.

6. The transaxle device according to claim 3, further comprising:
 a switching mechanism which includes a sleeve or a clutch interposed on a second power transmission path from the engine to the output shaft and switches a high gear stage and a low gear stage.

* * * * *